US012202276B2

(12) United States Patent
Ito et al.

(10) Patent No.: US 12,202,276 B2
(45) Date of Patent: Jan. 21, 2025

(54) LASER MARKING APPARATUS

(71) Applicant: Keyence Corporation, Osaka (JP)

(72) Inventors: Takaaki Ito, Osaka (JP); Hayato Funahashi, Osaka (JP); Hiromi Endo, Osaka (JP); Takanori Ando, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 265 days.

(21) Appl. No.: 17/981,501

(22) Filed: Nov. 7, 2022

(65) Prior Publication Data

US 2023/0202198 A1 Jun. 29, 2023

(30) Foreign Application Priority Data

Dec. 28, 2021 (JP) ................................ 2021-215003

(51) Int. Cl.
*B41J 11/46* (2006.01)
*B41J 2/44* (2006.01)

(52) U.S. Cl.
CPC ............... *B41J 2/442* (2013.01); *B41J 11/46* (2013.01)

(58) Field of Classification Search
CPC .................................. B41J 11/46; B41J 2/442
See application file for complete search history.

(56) References Cited

U.S. PATENT DOCUMENTS 6,411,324 B1 * 6/2002 Christiansen ........ B41J 11/0065 347/234

FOREIGN PATENT DOCUMENTS

JP 2003212222 A 7/2003
WO WO-2006036018 A1 * 4/2006 ........... B41J 11/008

OTHER PUBLICATIONS

U.S. Appl. No. 17/980,574, filed Nov. 4, 2022 (151 pages).
U.S. Appl. No. 17/980,576, filed Nov. 4, 2022 (79 pages).
U.S. Appl. No. 17/980,578, filed Nov. 4, 2022 (75 pages).

* cited by examiner

*Primary Examiner* — Scott A Richmond
(74) *Attorney, Agent, or Firm* — Kilyk & Bowersox, P.L.L.C.

(57) ABSTRACT

To improve convenience in use of a laser marking apparatus that performs marking on a workpiece to which an alignment mark is affixed. The laser marking apparatus includes a setting section, a second IF section, a movement amount monitoring section, and a marking control section, and the setting section causes a display section to display a setting-assist image, which visually indicates the alignment mark on the flexible workpiece and a trigger delay, and receives a user input for setting the trigger delay in a state where the setting-assist image is displayed.

9 Claims, 27 Drawing Sheets

LASER MARKING APPARATUS

CROSS-REFERENCE TO RELATED APPLICATIONS

The present application claims foreign priority based on Japanese Patent Application No. 2021-215003, filed Dec. 28, 2021, the contents of which are incorporated herein by reference.

BACKGROUND OF THE INVENTION

1. Field of the Invention

The disclosure relates to a laser marking apparatus.

2. Description of Related Art

For example, JP 2003-212222 A discloses that a print apparatus is arranged on a movement path of a strip-shaped film, and printing is performed on the strip-shaped film by the print apparatus. The strip-shaped film is provided with register marks at predetermined intervals along a conveyance direction, and a sensor senses the register marks to cause the apparatus to recognize a current position of the strip-shaped film.

The printing can be performed at a desired position in the film by aligning the strip-shaped film.

That is, the register mark according to JP 2003-212222 A functions as a so-called “alignment mark” for aligning the strip-shaped film at the time of printing.

Meanwhile, when the alignment mark as described in JP 2003-212222 A has been sensed, the determination as to which position of the strip-shaped film the printing is to be performed is adjusted through a timing when a trigger signal is sent to the printing apparatus.

For example, it is possible to perform printing as fast as possible by performing the adjustment so as to output the trigger signal immediately after the alignment mark is sensed. Alternatively, a print timing can be delayed by adjusting the trigger signal to be output after the strip-shaped film is moved over a certain distance after the alignment mark has been sensed.

However, such adjustment requires trial and error even for a skilled user, and there is a problem that convenience in use of the apparatus is poor. Such a problem is not limited to the print apparatus disclosed in JP 2003-212222 A, and is also common to so-called laser marking apparatuses configured to mark a sheet-like flexible workpiece.

SUMMARY OF THE INVENTION

The technology disclosed herein has been made in view of such a point, and an object thereof is to improve the convenience in use of a laser marking apparatus that performs marking on a workpiece to which an alignment mark is affixed.

According to one embodiment of the disclosure, provided is a laser marking apparatus that performs marking using laser light on a sheet-like flexible workpiece to which alignment marks are affixed at equal intervals along a conveyance direction. The laser marking apparatus includes: a laser light generation section that generates the laser light; a laser light scanning section that scans a surface of the flexible workpiece with the laser light generated by the laser light generation section; a setting section that sets a print pattern that needs to be marked on the flexible workpiece and an offset amount from an irradiation range of the laser light by the laser light scanning section to a marking start position of the print pattern in the flexible workpiece when a predetermined trigger signal is received; an interface section that receives the trigger signal every time the alignment mark is detected during conveyance of the flexible workpiece; a movement amount monitoring section that determines whether or not a movement amount of the flexible workpiece corresponding to the trigger signal has reached an offset amount every time the interface section receives the trigger signal; and a marking control section that controls the laser light scanning section such that the print pattern set by the setting section is marked on the flexible workpiece based on a determination result of the movement amount monitoring section when the interface section receives the trigger signal.

Further, according to the one embodiment, the setting section is configured to cause a display section to display a setting-assist image, which visually indicates the alignment marks on the flexible workpiece and the offset amount, and to receive a user input for setting the offset amount in a state where the setting-assist image is displayed.

Here, the “offset amount” may be configured to be directly input by the user, or may be configured to cause the user to input other parameters and to be calculated by the setting section based on the other parameters.

According to the one embodiment, the laser marking apparatus starts the marking when the movement amount of the workpiece reaches the offset amount. Here, as the setting-assist image is displayed on the display section, even an unfamiliar user can easily set the offset amount with reference to the setting-assist image. Accordingly, the convenience in use of the laser marking apparatus can be improved.

In addition, according to another embodiment of the disclosure, the laser marking apparatus may display one of a plurality of setting-assist images, which are different from each other, is displayed on the display section as the setting-assist image, and the setting section may display a setting-assist image corresponding to a posture of the laser marking apparatus among the plurality of setting-assist images.

According to the another embodiment, the setting-assist images suitable for installation situations of the laser marking apparatus can be displayed, and accordingly, the convenience in use of the laser marking apparatus can be further improved.

In addition, according to still another embodiment of the disclosure, the setting section may receive a user input indicating a posture of the laser marking apparatus, and display a setting-assist image corresponding to the posture indicated by the user input from among the plurality of setting-assist images.

According to the still another embodiment, the posture of the laser marking apparatus can be input, and the setting-assist image suitable for the input content can be displayed, so that the convenience in use of the laser marking apparatus can be further improved.

In addition, according to still another embodiment of the disclosure, the setting section may cause the display section to display images obtained by rotating one setting-assist image each by 90°, 45°, or 30° as the plurality of setting-assist images.

According to the still another embodiment, one setting-assist image is rotated by 90°, 180°, or 270° and displayed instead of preparing the plurality of setting-assist images. This makes it possible to more easily display the image suitable for the posture of the laser marking apparatus.

In addition, according to still another embodiment of the disclosure, the setting-assist image may further visually indicate a distance between a sensor that detects the alignment marks and the laser marking apparatus, and the setting section may be configured to receive an input of the distance indicated by the setting-assist image.

According to the still another embodiment, the input of the distance is received instead of directly receiving the input of the offset amount. The magnitude of the distance can be measured using a ruler or the like. Therefore, the configuration according to the still another embodiment contributes to improvement in the convenience in use of the laser marking apparatus.

In addition, according to still another embodiment of the disclosure, the setting-assist image may further visually indicate a start position of marking in the irradiation range, and an end position of the marking in the irradiation range, and the setting section may be configured to receive inputs of the start position and the end position.

According to the still another embodiment, not only the offset amount but also more detailed settings can be performed. For example, when the start position of the marking is set close to a central portion of the irradiation range, print quality can be improved as compared with a case where the start position is set at an edge portion of the irradiation range. Since it is configured such that more detailed settings are allowed in this manner, it is possible to implement the settings with more variations, which is advantageous in terms of improving the convenience in use of the laser marking apparatus.

In addition, according to still another embodiment of the disclosure, the setting section may be configured to be capable of switching a display content on the display section between a first setting screen that visually indicates the setting-assist image, and a second setting screen that receives an input of print quality including a scanning speed of the laser light scanning section.

In addition, according to still another embodiment of the disclosure, the laser marking apparatus may further include a second interface section connected to an encoder, which outputs a pulse signal in accordance with a conveyance speed of the flexible workpiece, so as to be capable of receiving the pulse signal, and the setting section may calculate the number of pulses output when the flexible workpiece moves by a predetermined distance based on the pulse signal input via the second interface section.

In addition, according to still another embodiment of the disclosure, the setting section may calculate an upper limit value of the number of times of marking executable per predetermined time based on a reception interval of the trigger signal by the interface section, a length of the irradiation area in the conveyance direction, and a marking time required for marking the flexible workpiece.

As described above, according to the disclosure, the convenience in use can be improved in the laser marking apparatus that performs marking on the workpiece to which the alignment mark is affixed.

DETAILED DESCRIPTION OF PREFERRED EMBODIMENTS

Hereinafter, an embodiment of the disclosure will be described with reference to the drawings. Note that the following description is given as an example.

That is, print processing (hereinafter, referred to as "marking" or "printing", or may be simply referred to as "processing") will be described as a representative example of marking using laser light in this embodiment, but the disclosure can be applied to any marking including a plurality of scanning lines, such as marking of a figure.

<Overall Configuration>

Figure 1:
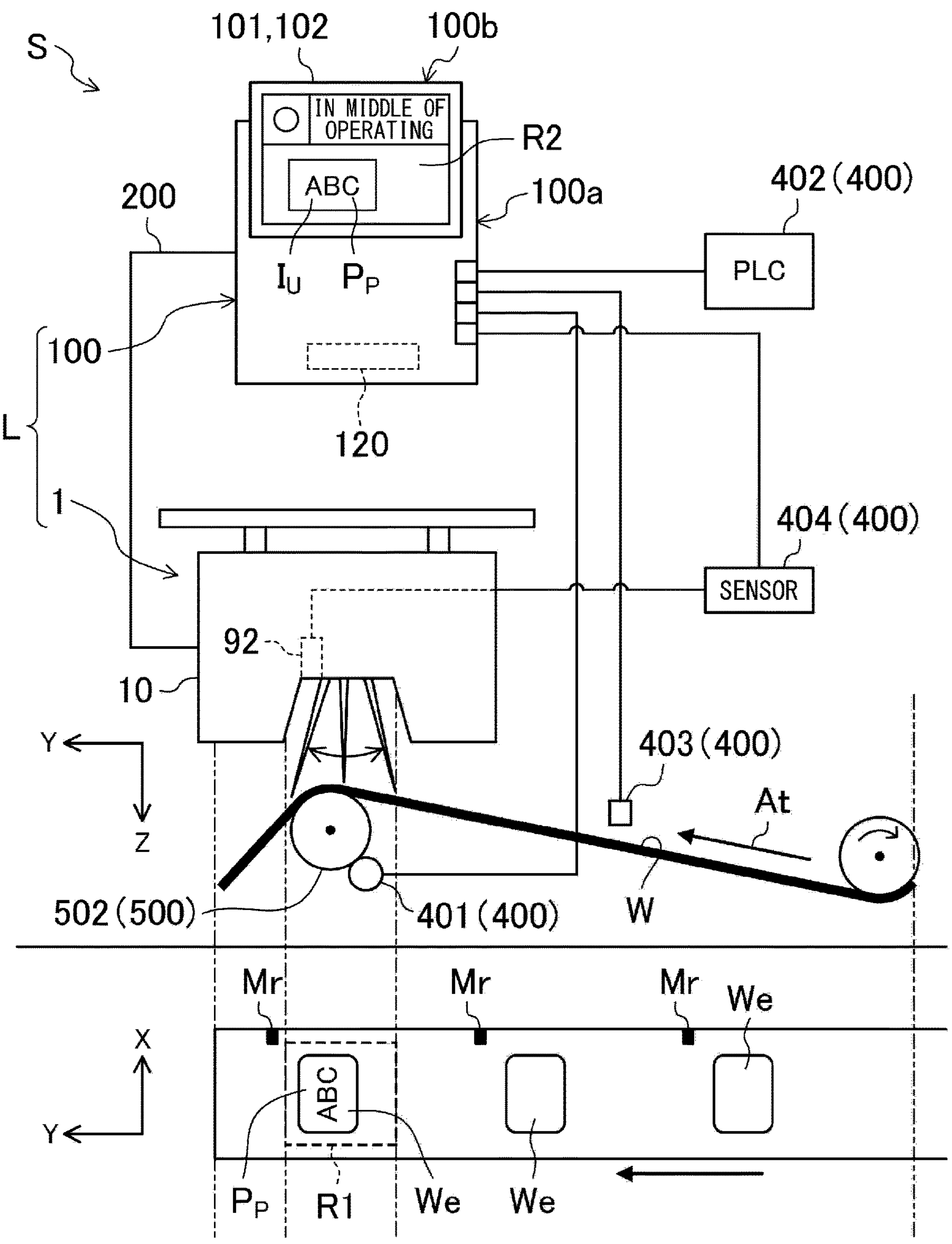
FIG. 1 is a diagram illustrating an overall configuration of a laser marking system.
Figure 2:
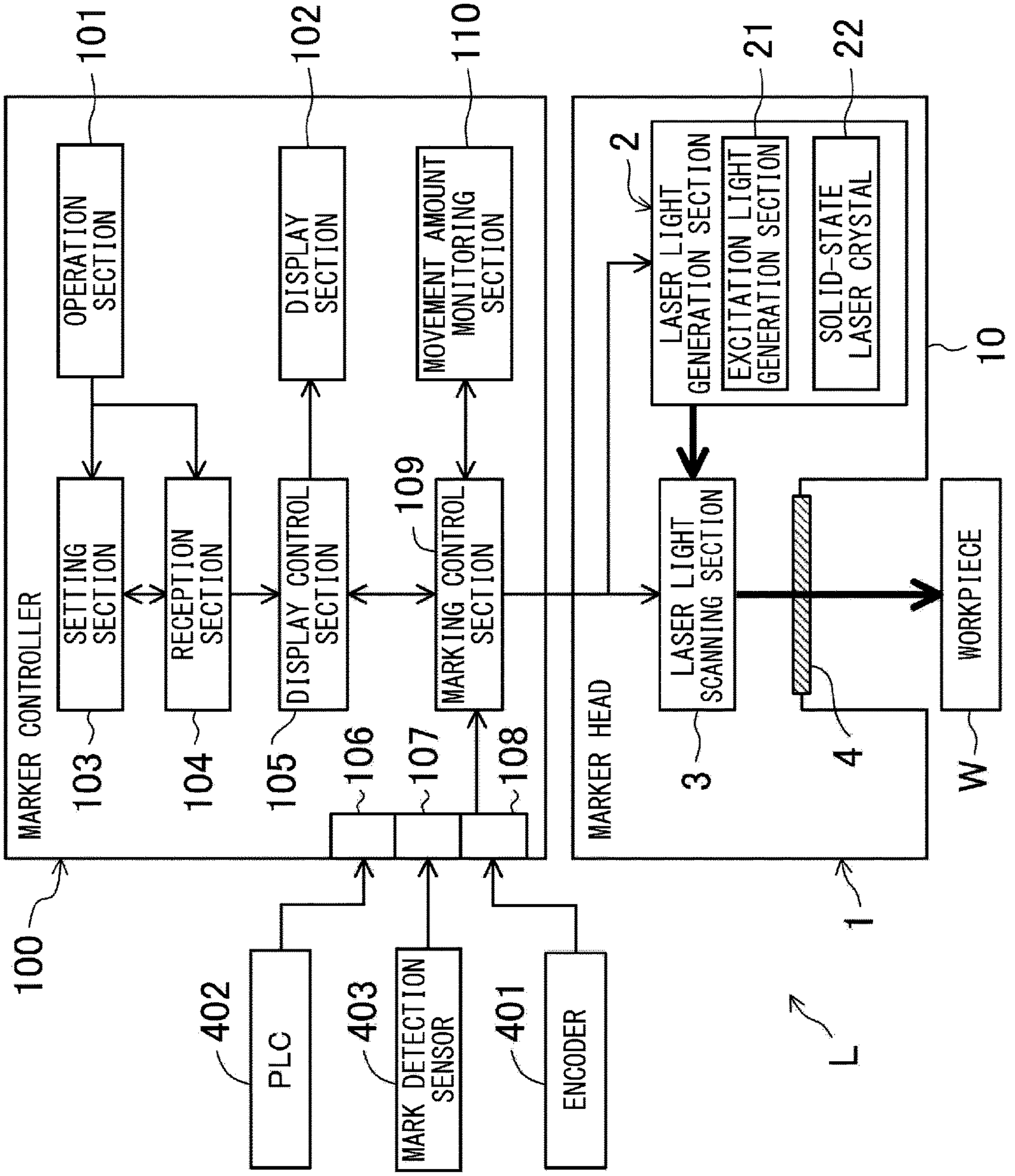
FIG. 2 is a block diagram illustrating a schematic configuration of a laser marking apparatus.
Figure 3:
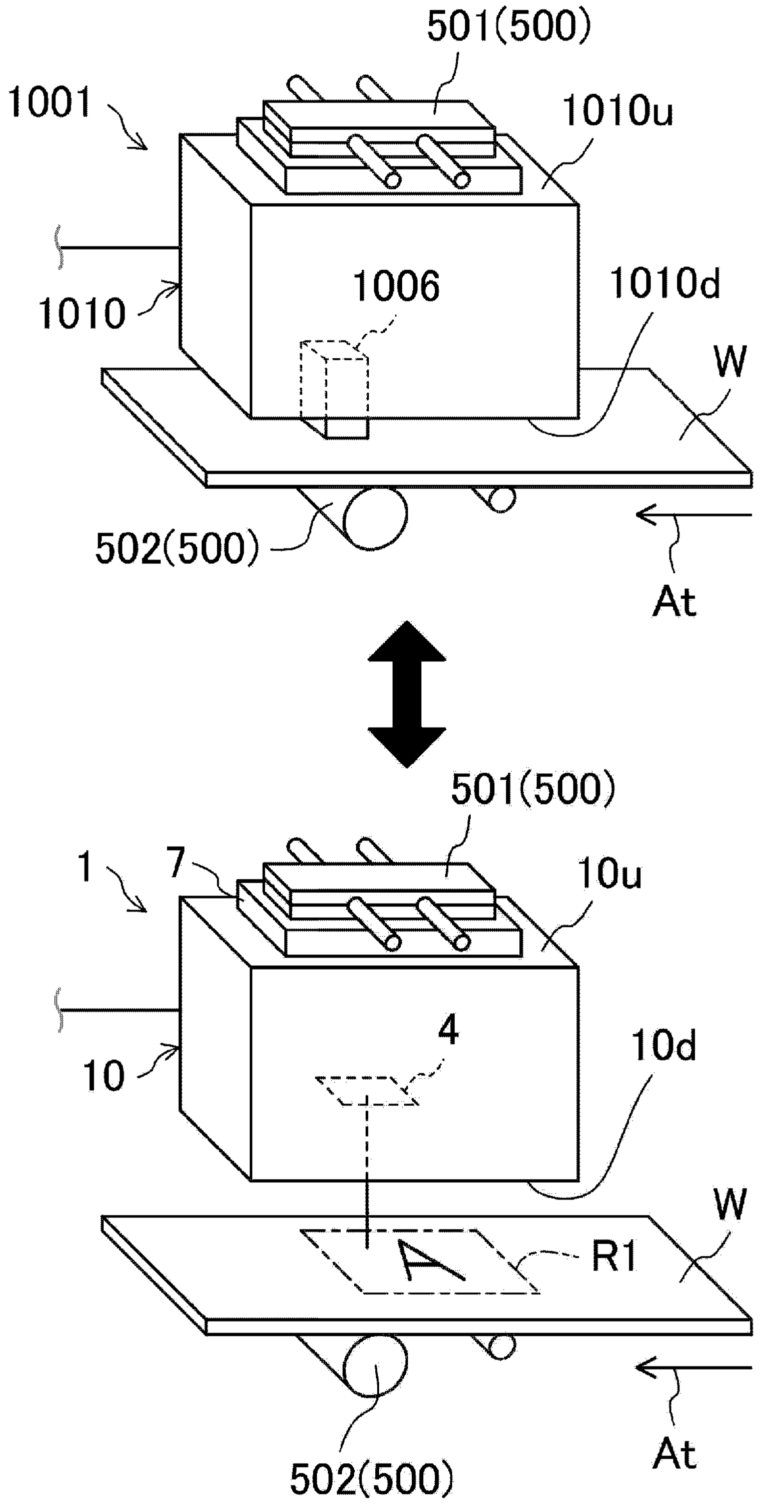
FIG. 3 is a diagram for describing replacement of a printing apparatus and a marker head.

FIG. 1 is a diagram illustrating an overall configuration of a laser marking system S, and FIG. 2 is a diagram illustrating a schematic configuration of a laser marking apparatus L in the laser marking system S. In addition, FIG. 3 is a diagram for describing replacement of a printing apparatus 1001 and a marker head 1.

The laser marking system S illustrated in FIG. 1 includes the laser marking apparatus L, an external device 400 connected thereto, and a processing equipment 500 to which the laser marking apparatus L is attached and which conveys a workpiece W. Among them, the laser marking apparatus L illustrated in FIGS. 1 and 2 irradiates a predetermined irradiation area R1 with laser light and scans the surface of the workpiece W with the laser light.

The laser marking apparatus L can perform marking using the laser light on the sheet-like flexible workpiece W (hereinafter, the "flexible workpiece" is simply referred to as the workpiece) by performing the scanning with the laser light as described above. Note that this marking is performed in accordance with a print pattern Pp, a print job Pb, and a print job Pj set in advance.

Note that the irradiation area R1 referred to herein is an area set on the surface of the workpiece W, and is an area corresponding to a print surface associated in advance with a setting plane R2 on the display section 102. The irradiation area R1 as the print surface can take various forms in accordance with a relative positional relationship between the laser marking apparatus L and the workpiece W, specifications of the laser marking apparatus L, a movement path of the workpiece W, and the like. For example, the irradiation area R1 of the workpiece W moving along a two-dimensional plane is a plane along the movement path thereof. On the other hand, the irradiation area R1 of the workpiece W moving in a three-dimensional space can be a curved surface along the movement path thereof.

In addition, the print pattern Pp in the following description includes not only a pattern of a character that needs to be marked on the workpiece W but also a pattern of a figure that need to be marked on the workpiece W, such as ":", "×", a bar code, or a QR code (registered trademark).

In particular, the laser marking apparatus L according to this embodiment can emit laser light having a wavelength near 350 nm as the laser light for processing the workpiece W. This wavelength is included in a wavelength range of ultraviolet rays. Therefore, the laser light for processing the workpiece W is sometimes referred to as "UV laser light" to be distinguished from other laser light such as near-infrared rays in the following description.

Hereinafter, a case will be described in which the workpiece (the above-described "flexible workpiece") W made of a sheet-like film is set as an object to be marked, and the film contains a UV-reactive layer (not illustrated) that chemically reacts with UV laser light.

Note that the workpiece W in the disclosure may be made of a plastic film, a film containing an aluminum layer, a film containing an aluminum vapor deposition layer, or a film containing a paper layer. The workpiece W can be configured using films made of various materials. In addition, the film forming the workpiece W may have a three-layer structure or a multilayer structure of three or more layers.

In addition, the workpiece W according to this embodiment is formed by arranging a plurality of workpiece elements We side by side along a predetermined conveyance direction At as illustrated in FIG. 1. The workpiece elements We may be integrally connected along the conveyance direction At, or may be arranged at intervals in the conveyance direction At. The respective workpiece elements We are individually marked by the laser marking apparatus L. The workpiece element We can also be rephrased as a plurality of processing target areas or non-print areas set on the surface of the workpiece W and arranged at equal intervals along the conveyance direction At.

Here, it is conceivable to sense a relative position of each of the workpiece elements We with respect to the marker head 1 every time in order to perform similar marking to each of the plurality of workpiece elements We. Therefore, alignment marks Mr are attached to the surface of the workpiece W at equal intervals along the conveyance direction. As illustrated in FIG. 1, each of the alignment marks Mr may be attached to a site between the workpiece elements We arranged side by side in the conveyance direction At. Alternatively, each of the alignment marks Mr may be attached to one side (+X side or −X side in FIG. 1) in a conveyance width direction of each of the workpiece elements We (not illustrated).

In addition, the laser marking apparatus L according to this embodiment is configured to perform so-called two-dimensional printing by performing two-dimensional scanning with laser light, but so-called three-dimensional printing can also be performed since the laser marking apparatus L is configured to have a deeper depth of focus than a conventional product. Therefore, the laser marking apparatus L can mark even the workpiece W conveyed along a three-dimensional movement path.

As illustrated in FIGS. 1 and 2, the laser marking apparatus L according to this embodiment includes a marker head 1 and a marker controller 100. The marker head 1 and the marker controller 100 are separated from each other in this embodiment, and are connected by a cable 200. The cable 200 according to this embodiment may be configured by bundling at least some of an electric wiring for transmitting electric power from the inside of the marker controller 100 to the marker head 1, such an electric wiring, and a signal wiring for transmitting and receiving an analog signal, a digital signal, and the like.

(Marker Controller 100)

The marker controller 100 includes a controller main body **100*a* for controlling the marker head 1 and a user terminal 100*b*** for receiving various inputs from a user.

Among them, the controller main body **100*a* can scan the surface of the workpiece W with laser light by controlling the marker head 1 according to, for example, a setting related to the print pattern Pp. The controller main body 100*a* includes a storage apparatus 120 for storing such a setting. The storage apparatus 120** is formed by combining a volatile memory and/or a non-volatile memory.

For example, the controller main body **100*a* includes a marking control section 109 illustrated in FIG. 2 as a functional element for controlling the marker head 1. The marking control section 109 is electrically connected to a laser light generation section 2 and a laser light scanning section 3, which will be described later, in the marker head 1, and can perform the marking using the laser light on the workpiece W by controlling the laser light generation section 2 and the laser light scanning section 3. Other details of the controller main body 100*a*** will be described later.

On the other hand, the user terminal **100*b* includes, for example, a central processing unit (CPU) and a memory, and is connected to the controller main body 100*a*** so as to be capable of transmitting and receiving an electrical signal in a wired or wireless manner.

In particular, the user terminal **100*b* according to this embodiment can be configured using a touch panel console. The user terminal 100*b* may be configured separately from or integrally with the controller main body 100*a***. In the case of being separately configured, the user terminal can be configured using a tablet terminal, a desktop computer, a laptop computer, or the like, instead of the touch panel console.

The user terminal **100*b* functions as a terminal configured to set various printing conditions, such as a size of a character, and indicate information related to marking on the workpiece W to a user. The user terminal 100*b* includes the display section 102 configured to display information to the user, an operation section 101 that receives an operation input from the user, and a storage apparatus (not illustrated) configured to store various types of information. Note that the user terminal 100*b* may be referred to as a print setting apparatus for setting various printing conditions. In addition, the marker head 1 and the marker controller 100** may be collectively referred to as a laser marker.

The display section 102 can display the setting plane R2 defined by orthogonal coordinates. The display section 102 is an example of a "display unit" in this embodiment. In addition, an input interface Iu that receives an input of a character (hereinafter, referred to as the "print pattern Pp") that needs to be marked is arranged on the setting plane R2 displayed by the display section 102 as illustrated in FIG. 1. The input interface Iu includes user interfaces, such as a frame indicating a range of the setting plane R2 and a figure indicating a position of the print pattern Pp on the setting plane R2, and can receive the input of the print pattern Pp based on an operation input with respect to the operation section 101 and display a content of the received print pattern Pp on the setting plane R2.

Specifically, the display section 102 is configured using, for example, a liquid crystal display or an organic EL panel. When the user terminal **100*b* is incorporated in a controller main body 100*a* or the touch panel console is used, a display screen provided on the controller main body 100*a*** or the console can be used as the display section.

The operation section 101 can be configured using a keyboard and a pointing device. Here, the pointing device includes a mouse, a joystick, or the like. When the user terminal **100*b* is incorporated in the controller main body 100*a* or the touch panel console is used, a switch, a button, or a display itself provided in the controller main body 100*a*** or the console can be used as the operation section.

The user terminal **100*b*** configured as described above can set printing conditions in marking based on the operation input from the user. The printing conditions include a target output (laser power) of laser light, a scanning speed (scan speed) of the laser light on the workpiece W, and the like as well as details of the print pattern Pp.

The printing conditions set by the user terminal **100*b* are output to the controller main body 100*a* and stored in the storage apparatus 120 of the controller main body 100*a*. The printing conditions may be stored in the storage apparatus of the user terminal 100*b*** if necessary.

(Marker Head 1)

Meanwhile, the marker head 1 is electrically connected to the marker controller 100. The marker head 1 can communicate with the marker controller 100 in a wired or wireless manner, and can emit UV laser light toward the irradiation area R1 by being controlled by the marker controller 100.

The marker head 1 according to this embodiment is installed on the processing equipment 500 that processes the workpiece W made of a sheet-like film. As illustrated in FIG. 3, the processing equipment 500 includes a support member 501 that supports the marker head 1 and a conveyance roller 502 around which the workpiece W is placed.

Among them, the support member 501 can attach the laser marking apparatus L, particularly a housing 10 of the marker head 1, to a predetermined attachment position as illustrated in FIG. 3. The support member 501 illustrated in FIGS. 1 and 3 can allow the housing 10 to be suspended from above as an example of the configuration thereof.

On the other hand, the conveyance roller 502 is formed in a cylindrical shape having a central axis extending in a lateral direction of the workpiece W. In this case, the workpiece W is conveyed in a longitudinal direction along a predetermined movement path by the rotation of the conveyance roller 502.

Here, the processing equipment 500 according to this embodiment is shared between the marker head 1 according to this embodiment and the printing apparatus 1001 that performs printing using a scheme other than the marking using laser light as illustrated in the upper diagram and the lower diagram of FIG. 3.

That is, the marker head 1 according to this embodiment can be attached to the support member 501 of the processing equipment 500, configured to attach the printing apparatus 1001, instead of the printing apparatus 1001.

Examples of the printing apparatus 1001 that can be replaced with the marker head 1 include a thermal transfer overprinter (TTO), but can also be replaced with other printing apparatuses 1001.

Specifically, as the printing apparatus 1001 that can be replaced as described above, for example, any printing apparatus provided with a housing 1010 that is formed in a substantially rectangular parallelepiped shape and includes a printing surface **1010*d* obtained by exposing a printing section 1006 in contact with a printing area on the workpiece W, and a connection surface 1010*u* which is one surface different from the printing surface 1010*d* and connectable to the support member 501**.

In this case, the marker head 1 is supported by the support member 501 connectable to the connection surface **1010*u* similarly to the printing apparatus 1001 as illustrated in the upper diagram and the lower diagram of FIG. 3. The marker head 1 thus supported irradiates the irradiation area R1 set so as to correspond to the printing area (area in contact with the printing section 1006 in the printing apparatus 1001**) with UV laser light, thereby marking the workpiece W.

In addition, the laser marking apparatus L according to this embodiment includes an imaging apparatus 92 for capturing an image of a marking result. The imaging apparatus 92 is arranged on an outer surface of the housing 10 of the marker head 1 or inside the housing 10, and can capture an image of the surface of the workpiece W. The imaging apparatus 92 is electrically connected to an image sensor 404 forming one of the external devices 400.

The external device 400 is connected to the marker controller 100 as necessary. In the example illustrated in FIGS. 1 and 2, the external devices 400 include an encoder 401, a programmable logic controller (PLC) 402, a mark detection sensor 403, and the above-described image sensor 404. Among these devices, the encoder 401 is connected to the marker controller 100 via a first interface section 106. Similarly, the PLC 402 is connected to the marker controller 100 via a second interface section 107, and the mark detection sensor 403 is connected to the marker controller 100 via a third interface section 108. Although not illustrated, the image sensor 404 may be connected to the marker controller 100 via a so-called "fourth interface section".

Hereinafter, the first interface section 106, the second interface section 107, and the third interface section 108 may be referred to as the first IF section 106, the second IF section 107, and the third IF section 108, respectively.

In this embodiment, the encoder 401 is configured using a rotary encoder, and can detect a conveyance speed of the workpiece W. The encoder 401 outputs a signal (detection signal) indicating a detection result to the marker controller 100. The marker controller 100 controls two-dimensional scanning or the like of laser light based on the detection signal input from the encoder 401.

As illustrated in FIG. 1, the encoder 401 configured using the rotary encoder is arranged to rotate its own wheel as the conveyance roller 502 rotates. The encoder 401 is configured to convert the rotation of the wheel into a pulse signal (so-called "encoder pulse") and output the pulse signal.

Here, the number of pulses output from the encoder 401 (hereinafter, referred to as "number of output pulses") increases or decreases depending on a rotation speed of the conveyance roller 502 when the workpiece W moves over a unit distance along the conveyance direction At. The number of output pulses of the encoder 401 characterizes the rotation speed of the conveyance roller 502, and thus, the conveyance speed of the workpiece W. The conveyance speed of the workpiece W can be detected through the number of output pulses.

The PLC 402 is configured using, for example, a microprocessor, and can input a control signal to the marker controller 100. The PLC 402 is used to control the laser marking system S according to a predetermined sequence.

The mark detection sensor 403 includes, for example, a light-receiving photoelectric sensor (so-called color sensor), and can detect a position of the alignment mark Mr affixed to the surface of the workpiece W. The mark detection sensor 403 outputs a signal (trigger signal) indicating a detection signal thereof to the marker controller 100. The marker controller 100 controls a marking start timing and the like based on the trigger signal input from the mark detection sensor 403.

The image sensor 404 is electrically connected to the imaging apparatus 92, and receives an input of an image signal generated by the imaging apparatus 92. The image sensor 404 inspects a print content processed on the surface of the workpiece W based on the input image signal. At that time, inspection based on a shape, a color, gloss, and the like of marking may be performed, and inspection using an optical character reader (OCR) may be performed particularly when a character string is marked.

A signal indicating a result of the inspection by the image sensor 404 can be input to at least one of the PLC 402 and the marker controller 100. The PLC 402 and/or the marker controller 100 may control the operation of the processing equipment 500 and/or the laser marking apparatus L based on the input signal.

Note that the image sensor 404 may be incorporated in the marker controller 100. In other words, the marker controller 100 can be caused to perform the function that needs to be performed by the image sensor 404 by directly connecting the imaging apparatus 92 and the marker controller 100.

In addition to the above-described devices and apparatuses, an apparatus configured to perform operation and control, a computer configured to perform various other processes, a storage apparatus, a peripheral device, and the like can be connected to the laser marking apparatus L in a wired or wireless manner.

<Marker Head 1>

As illustrated in FIG. 2, the marker head 1 includes the laser light generation section 2 and the laser light scanning section 3 as main constituent elements. The laser light generation section 2 generates laser light (for example, UV laser light) based on electric power supplied from the outside of the marker head 1. The laser light scanning section 3 reflects the laser light generated by the laser light generation section 2 in a desired direction to scan the surface of the workpiece W with the laser light.

The marker head 1 also includes the housing 10 that accommodates the above-described constituent elements, that is, the laser light generation section 2 and the laser light scanning section 3. An exit window 4 that transmits the laser light reflected by the laser light scanning section 3 is formed in the housing 10. Although not described in detail, the housing 10 has a substantially rectangular parallelepiped outer shape, and includes an exit surface 10*d* on which the exit window 4 is formed, and an attachment surface 10*u* that is one surface different from the exit surface 10*d* and connectable to the support member 501. The attachment surface 10*u* is connected to the support member 501 via an attachment 7 (see FIG. 3).

(Laser Light Generation Section 2)

The laser light generation section 2 generates excitation light corresponding to electric power supplied via the cable 200 based on the electric power. The excitation light source 21 for generating the excitation light may be, for example, a laser diode. The excitation light source 21 may be accommodated in the marker controller 100 instead of the housing 10. In this case, a part of the laser light generation section is accommodated in the marker controller 100, and the other part thereof is accommodated in the housing 10.

The laser light generation section 2 also includes a solid-state laser crystal 22 that generates a fundamental wave based on the generated excitation light, and a non-linear optical crystal (not illustrated) that modulates the fundamental wave to generate UV laser light.

As the solid-state laser crystal 22, for example, rod-shaped Nd:$YVO_4$ (yttrium vanadate) can be used. The fundamental wave can be generated by any method, such as a unidirectional excitation scheme by end pumping.

The non-linear optical crystal can be configured using a plurality of optical crystals such as an optical crystal for generating a second harmonic wave and an optical crystal for generating a third harmonic wave. As each of the optical crystals, various optical materials can be used.

(Laser Light Scanning Section 3)

The laser light scanning section 3 is configured using a so-called biaxial (X-axis and Y-axis) galvano scanner, and includes a first scanner (not illustrated) that scans laser light in the Y direction and a second scanner (not illustrated) that scans laser light in the X direction.

(Laser Light Scanning Section 3)

The laser light scanning section 3 is configured using a so-called biaxial (X-axis and Y-axis) galvano scanner, and includes a first scanner (not illustrated) that scans laser light in the Y direction and a second scanner (not illustrated) that scans laser light in the X direction.

The laser light scanning section 3 drives the first scanner and the second scanner in accordance with print data created in advance, thereby polarizing the laser light generated by the laser light generation section 2 so as to be emitted toward the irradiation area R1. The laser light deflected in this manner passes through the exit window 4 and is emitted to the irradiation area R1.

<Marker Controller 100>

As described above, the marker controller 100 includes the controller main body 100*a* for controlling the marker head 1 in addition to the user terminal 100*b* described above. The controller main body 100*a* includes, as main constituent elements, a setting section 103, a reception section 104, a display control section 105, the above-described first IF section 106, second IF section 107, and third IF section 108, the marking control section 109 similarly described above, and a movement amount monitoring section 110.

(Setting Section 103)

The setting section 103 sets a print block Pb in which a character string (print pattern Pp) that needs to be marked on each of the workpiece elements We by the marking control section 109 is associated with attribute information of the print pattern Pp based on a user input through the operation section 101.

Here, the attribute information of the print pattern Pp includes, for example, one or more of a font of a character, a font size, a thickness of a character, a character interval, and a position of the print pattern Pp viewed on the setting plane R2.

Figure 14:
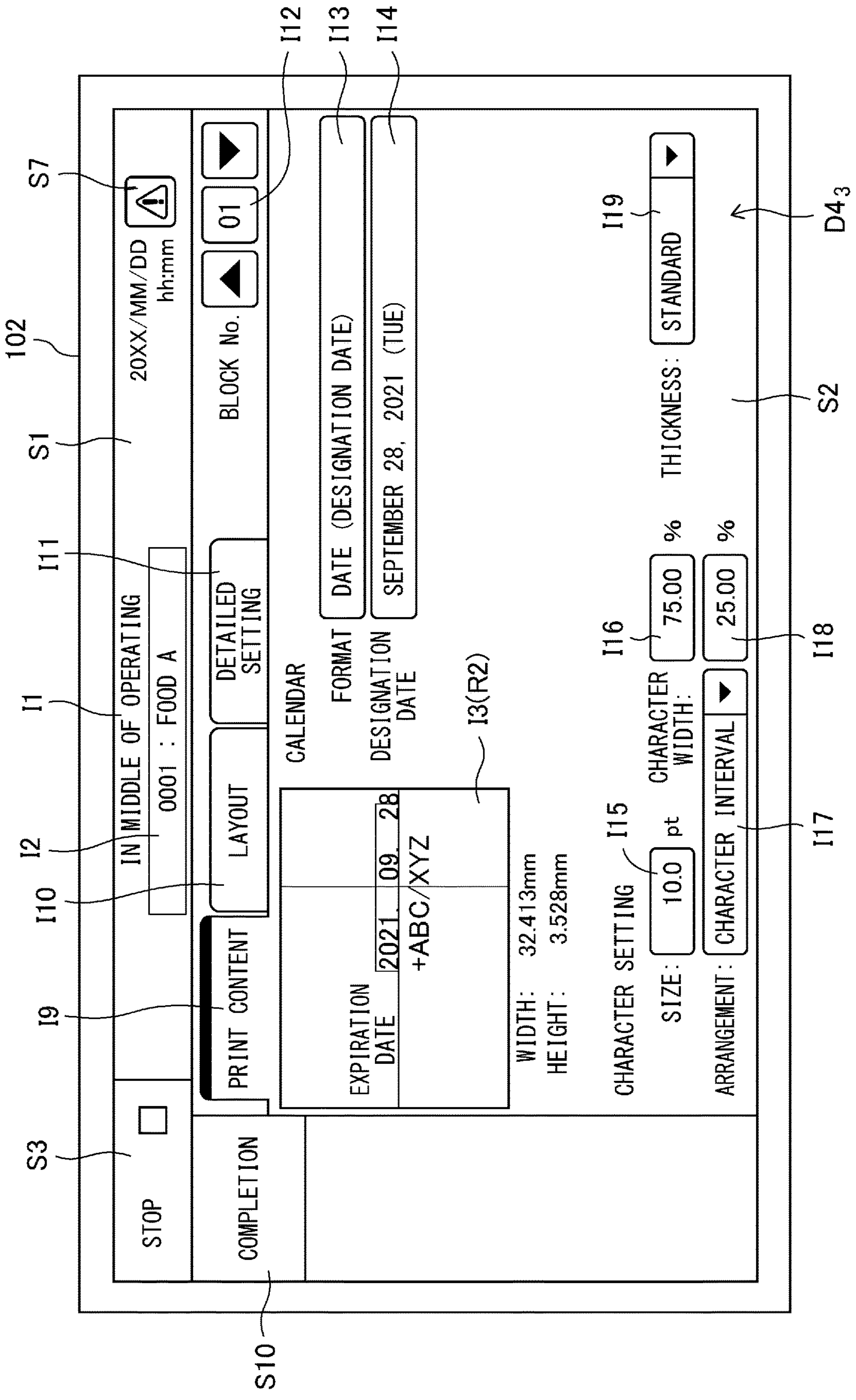
FIG. 14 is a diagram illustrating a display mode of a job editing screen.

Specifically, as illustrated in FIG. 14 and the like to be described later, the setting section 103 according to this embodiment displays the print block Pb on the setting plane R2 on the display section 102, and at the same time, displays an input field (for example, a fourteenth display item I14 in FIG. 14) of the print block Pb and an input field (for example, fifteenth display item I15 to nineteenth display item I19 in FIG. 14) of the attribute information in the vicinity thereof. A character string and/or a numerical value can be input to these input fields through a touch panel operation, an input with respect to the operation section 101, or the like, and the print block Pb can be set through such a user input.

Here, the setting section 103 can set a plurality of the print blocks Pb regarding marking that is performed on one workpiece element We, such as a first print block Pb indicating manufacturing year/month/day, a second print block Pb indicating a lot number, and a third print block Pb indicating a manufacturing factory.

Since the plurality of print blocks Pb can be set, for example, different fonts of characters can be used between the manufacturing year/month/day and the lot number, and marking with more variations can be implemented.

Figure 4:
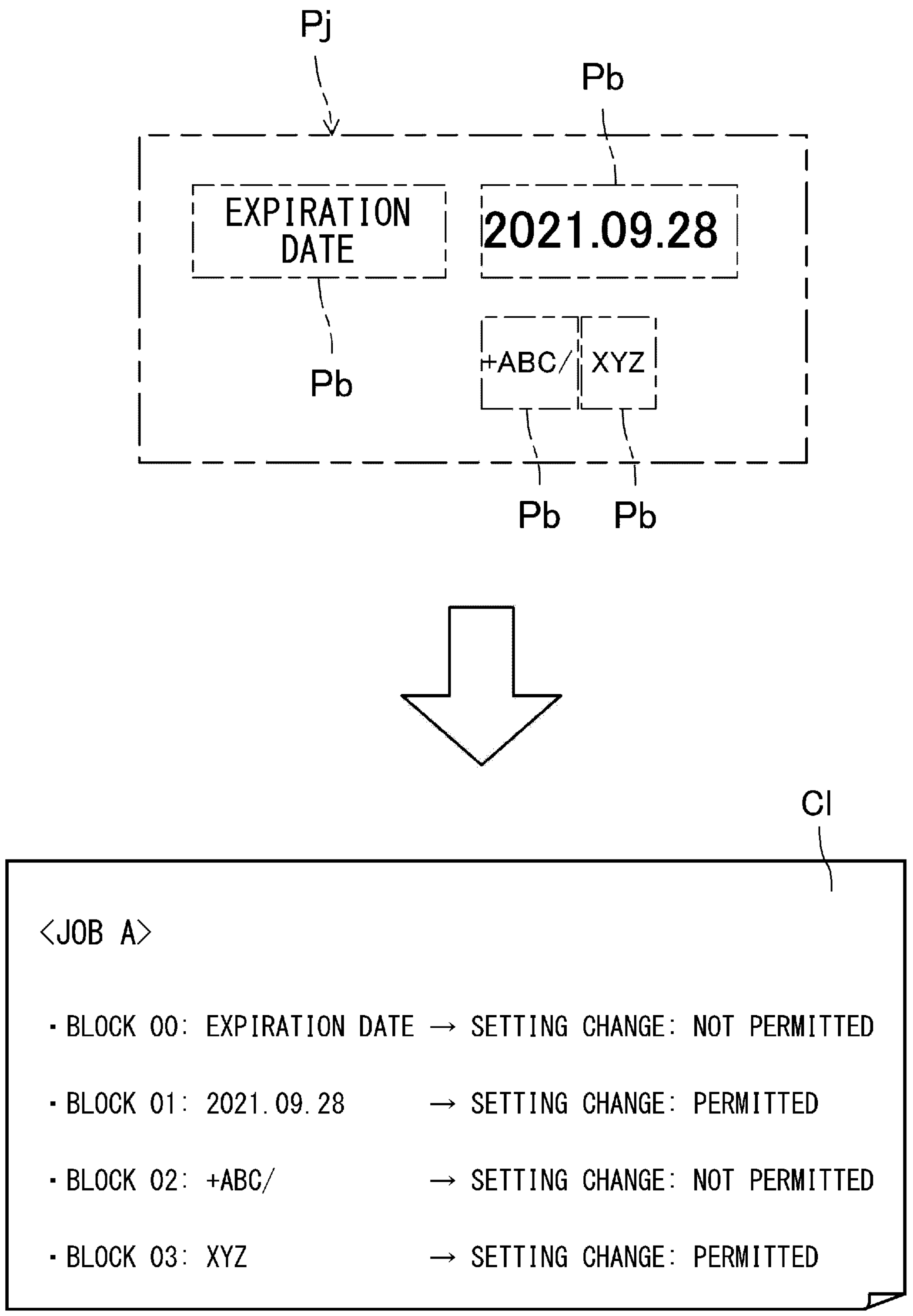
FIG. 4 is a diagram for describing a print block and a change rule thereof.

Further, the setting section 103 can generate the print job Pj in which the plurality of print blocks Pb are bundling in association with each other based on a user input through the operation section 101 (see the upper stage of FIG. 4). For example, it is possible to generate a first print job Pj in which a first print block Pb, a second print block Pb, and a third print block Pb are bundling, and to generate a second print job Pj in which a fourth print block Pb and a fifth print block Pb are bundling. Note that numbering such as the first print block Pb to the fifth print block Pb is merely an example. It is possible to generate the print job Pj by bundling any number of print blocks Pb.

Here, the setting section 103 can set a plurality of different print jobs Pj in accordance with types of the workpiece W, applications of marking, and the like, for example, a first print job Pj obtained by bundling print blocks Pb that need to be marked on a small bag of food A, a second print job Pj obtained by bundling print blocks Pb that need to be marked on a small bag of food B, and a third print job Pj obtained by bundling print blocks Pb that need to be marked on products other than the small bag.

Since it is possible to set the plurality of print jobs Pj, for example, when the workpiece W is switched, marking suitable for the workpiece W after the switching only by switching the print job Pj without resetting each of the plurality of print blocks Pb. A specific example of a user interface for setting the print job Pj will be described later.

The setting section 103 can also set a change rule Cl that defines whether or not to permit a change in the setting of each of the print blocks Pb for each of the plurality of print blocks Pb constituting each of the print jobs Pj (see the lower stage of FIG. 4). The change rule Cl can be stored in the storage apparatus 120, and can be newly created if necessary or can be stored to be overwritten on what has been created in advance.

Since the change rule Cl is set in advance, for example, when an operator of a manufacturing line tries to switch the print job Pj, it is possible to change a setting for the print block Pb indicating manufacturing year/month/day or the like having the print pattern Pp that may change every day can be changed every time. On the other hand, it is possible to fix a setting for the print block Pb indicating a manufacturing factory or the like having the print pattern Pp that basically remains unchanged without changing the setting.

The setting of the change rule Cl may be permitted on a condition that the user is a user having a predetermined management authority, such as a manager of a manufacturing line. In this case, a user having no management authority, such as an operator of the manufacturing line, is not permitted to set the change rule Cl, and is not possible to change the change rule Cl.

In addition, as the attribute information (hereinafter, also referred to as "job information") of the print job Pj, the setting section 103 can also set information other than the character string, such as a conveyance speed of the workpiece W and a parameter that characterizes a marking start timing.

Figure 6:
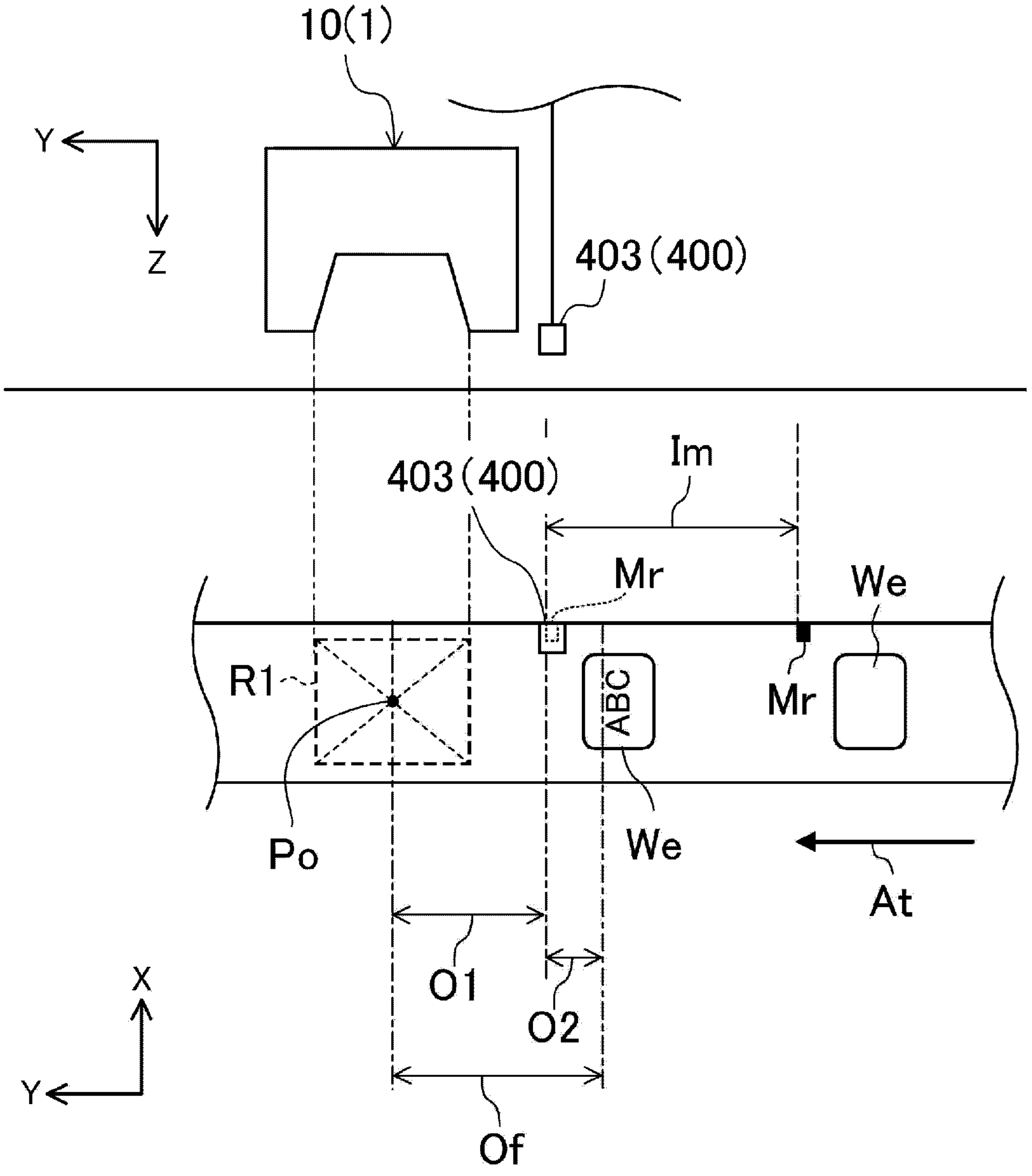
FIG. 6 is a diagram for describing a trigger delay.

For example, as the job information, the setting section 103 can set, for example, an offset amount (also referred to as a so-called "trigger delay") Of from the irradiation area R1 of laser light by the laser light scanning section 3 to the marking start position of the print pattern Pp in each of the workpiece elements We at the time of receiving a predetermined trigger signal (see FIG. 6). Here, the trigger signal is output every time the mark detection sensor 403 detects the alignment mark Mr.

Therefore, when a standby time from the detection of the alignment mark Mr by the mark detection sensor 403 to the start of marking on the workpiece element We corresponding to the alignment mark Mr is referred to as a "delay time", the trigger delay Of referred to herein can be regarded as the amount of movement of the workpiece W for the delay time. The marking can be performed at a more appropriate timing for each of the workpiece elements We by appropriately setting the trigger delay Of.

In particular, the trigger delay Of can be set by two separate parameters of an offset amount (hereinafter, also referred to as "first offset amount") O1 of the mark detection sensor 403 with respect to a reference point (for example, a center position of the irradiation area R1) Po in the irradiation area R1, and an offset amount (hereinafter, also referred to as "second offset amount") O2 of the alignment mark Mr with respect to the marking start position of each of the workpiece elements We.

In this case, the following relationship is established as illustrated in FIG. 6. Trigger delay (mm)=First offset amount (mm)+Second offset amount (mm) Note that a unit of each length is an example.

In addition, the trigger delay Of, the first offset amount O1, and the second offset amount O2 mentioned here are all defined as the magnitude of a distance along the conveyance direction At. Therefore, the first offset amount O1 can be rephrased as a distance from the reference point to the mark detection sensor 403. Similarly, the second offset amount O2 can be rephrased as a distance from the alignment mark Mr to the marking start position.

The first offset amount O1 is usually a positive value. On the other hand, the second offset amount O2 is allowed to be not only a positive value but also a negative value. The trigger delay Of needs to be a positive value.

For example, when the user inputs the first offset amount O1 and the second offset amount O2 in advance, the setting section 103 can automatically calculate a trigger delay Pf and store a result of the calculation in the storage apparatus 120. Since the trigger delay Of is set in advance and automatically, it is possible to save time and effort to set the marking start timing and improve usability.

Other input parameters related to the trigger delay Of and input interfaces therefor will be described later in detail when a specific example of the screen is described.

In addition, as the job information, the setting section 103 can also set whether to perform printing in a state where the conveyance of the workpiece W is temporarily stopped (so-called "stationary printing") or to perform printing in a state where the conveyance of the workpiece W is continued without being stopped (so-called "moving printing").

The setting section 103 also receives the user's operation of selecting the print job Pj, and executes switching to the selected print job Pj. Thereafter, the setting section 103 determines a trajectory that laser light needs to follow at the time of marking the character string constituting each of the print blocks Pb for each of the print blocks Pb constituting the selected print job Pj. The trajectory that the laser light needs to follow changes depending on the attribute information such as the thickness of the character and the character interval. Data determined by the setting section 103 is temporarily or continuously stored in the storage apparatus 120 of the controller main body 100*a*.

Hereinafter, data indicating the trajectory that the laser light needs to follow may be referred to as "deployment data", and processing for determining the deployment data may be referred to as "deployment processing".

(Reception Section 104)

The reception section 104 receives, through the operation section 101, a user input for changing a character string of the print block Pb for which the setting change has been permitted in the change rule Cl based on the change rule Cl set by the setting section 103.

For example, when switching the print job Pj, the reception section 104 according to this embodiment can display only the print blocks Pb for which the setting change has been permitted among the print blocks Pb constituting the print job Pj side by side on a screen (not illustrated). When a touch operation or the like is input to the screen, it is possible to change the character string of the print block Pb for which the setting change has been permitted.

Note that, regarding deployment data after the change of the character string, deployment processing by the setting section 103 is performed after the reception section 104 receives the change of the character string. The deployment data generated through the deployment processing is stored in the storage apparatus 120 and then appropriately read by the marking control section 109. Deployment data before the change of the character string may be generated before the change the character string, or may be generated after the change of the character string. In this embodiment, the deployment data before the change is generated in advance before the reception section 104 receives the change of the character string.

(First IF Section 106)

The first IF section 106 is electrically connected to the PLC 402, and receives a control signal output from the PLC 402 during the operation of the laser marking system S. This control signal is input to the marking control section 109 or the like via the first IF section 106, and is used to control the controller main body 100*a*.

(Second IF Section 107)

The second IF section 107 is electrically connected to the mark detection sensor 403, and receives a trigger signal indicating that the alignment mark Mr has been detected every time the alignment mark Mr is detected during the conveyance of the workpiece W. The second IF section 107 is an example of an "interface section" in this embodiment.

The trigger signal received by the second IF section 107 is input to the movement amount monitoring section 110 and the marking control section 109 via the second IF section 107. The trigger signal is used to control a timing to perform marking on each of the workpiece elements We together with the offset amount Of described above.

(Third IF Section 108)

The third IF section 108 is connected to the encoder 401 that outputs a pulse signal (encoder pulse) corresponding to the conveyance speed of the workpiece W so as to be capable of receiving the encoder pulse. The third IF section 108 is an example of a "second interface section" in this embodiment.

The encoder pulse received by the third IF section 108 is input to a third monitoring section 112 as the movement amount monitoring section, the marking control section 109, and the setting section 103 via the third IF section 108.

(Movement Amount Monitoring Section 110)

The movement amount monitoring section 110 is electrically connected to the second IF section 107 and the third IF section 108, and determines whether or not the amount of movement of the workpiece element We corresponding to the trigger signal has reached the offset amount (trigger delay Of) set by the setting section 103 every time the second IF section 107 receives the trigger signal.

The determination by the movement amount monitoring section 110 can be performed, for example, based on the number of pulses of the encoder pulses input to the third IF section 108 after the reception of the trigger signal or a time that has elapsed since the reception of the trigger signal. When it is determined that the offset amount has been reached after the reception of the trigger signal, the movement amount monitoring section 110 inputs a signal indicating such a fact to the marking control section 109.

(Marking Control Section 109)

The marking control section 109 reads deployment data stored in advance in the storage apparatus 120, and scans the laser light scanning section 3 such that laser light is scanned along a trajectory indicated by the read deployment data.

The marking control section 109 performs marking on each of the workpiece elements We by scanning the surface of each of the workpiece elements We with the laser light. As described above, the timing to start the marking in each of the workpiece elements We can be controlled by the trigger signal and the determination related to the offset amount.

Specifically, when the second IF section 107 receives the trigger signal, the marking control section 109 controls the laser light scanning section 3 such that the print pattern Pp set by the setting section 103 is marked on the flexible workpiece W based on the determination result by the movement amount monitoring section 110.

More specifically, the marking control section 109 is configured to read the deployment data and control the laser light scanning section 3 using the deployment data when it is determined that the movement amount of the workpiece element We corresponding to the trigger signal has reached the offset amount (trigger delay Of) after the reception of the trigger signal.

(Display Control Section 105)

The display control section 105 displays predetermined display screens on the display section 102 based on various electrical signals, and at the same time, can appropriately switch the display screens based on on/off of a key switch, a user input, or the like. Further, the display control section 105 is configured to cause a transition of a display mode of each of the display screens based on a state of the laser marking system S.

Specifically, in a case where the laser marking apparatus L is powered on, the display control section 105 can display a stop screen D1 indicating a stop state on the display section 102 when the apparatus L is in the stopped state, display an adjustment screen D2 indicating an adjustment state on the display section 102 when the apparatus L is in the adjustment state, display a standby screen D3 indicating a standby state on the display section 102 when the apparatus L is in the standby state, and display an operating screen D4 indicating an operating state on the display section 102 when the apparatus L is in the operating state.

Here, the "stopped state" indicates a state in which the laser marking apparatus L is powered on but the key switch is turned off. The "adjustment state" indicates a state in which the key switch is turned on in the stopped state, but the adjustment of the laser marking apparatus L such as the adjustment of the temperature of the solid-state laser crystal 22 is not completed. The "standby state" indicates a state in which the adjustment of the laser marking apparatus L has been completed in the adjustment state. The "operating state" indicates a state in which marking can be performed by the marking control section 109 as a result of operating a user interface in the standby state. For example, the stopped state and the adjustment state can be regarded as a state in which marking by the marking control section 109 is stopped.

The stop screen D1, the adjustment screen D2, the standby screen D3, and the operating screen D4 have a common layout except for some items. That is, these screens D1 to D4 can include a status bar S1 for displaying a current state, date and time, an error button, and the like of the laser marking apparatus L as display elements, a main display section S2 for displaying main information that needs to be delivered to the user, a switch button S3 for switching a state of the laser marking apparatus L, and a menu button S4 for switching a display content of the main display section S2. Among these display elements, at least the switch button S3 may be omitted on the stop screen D1.

Figure 5A:
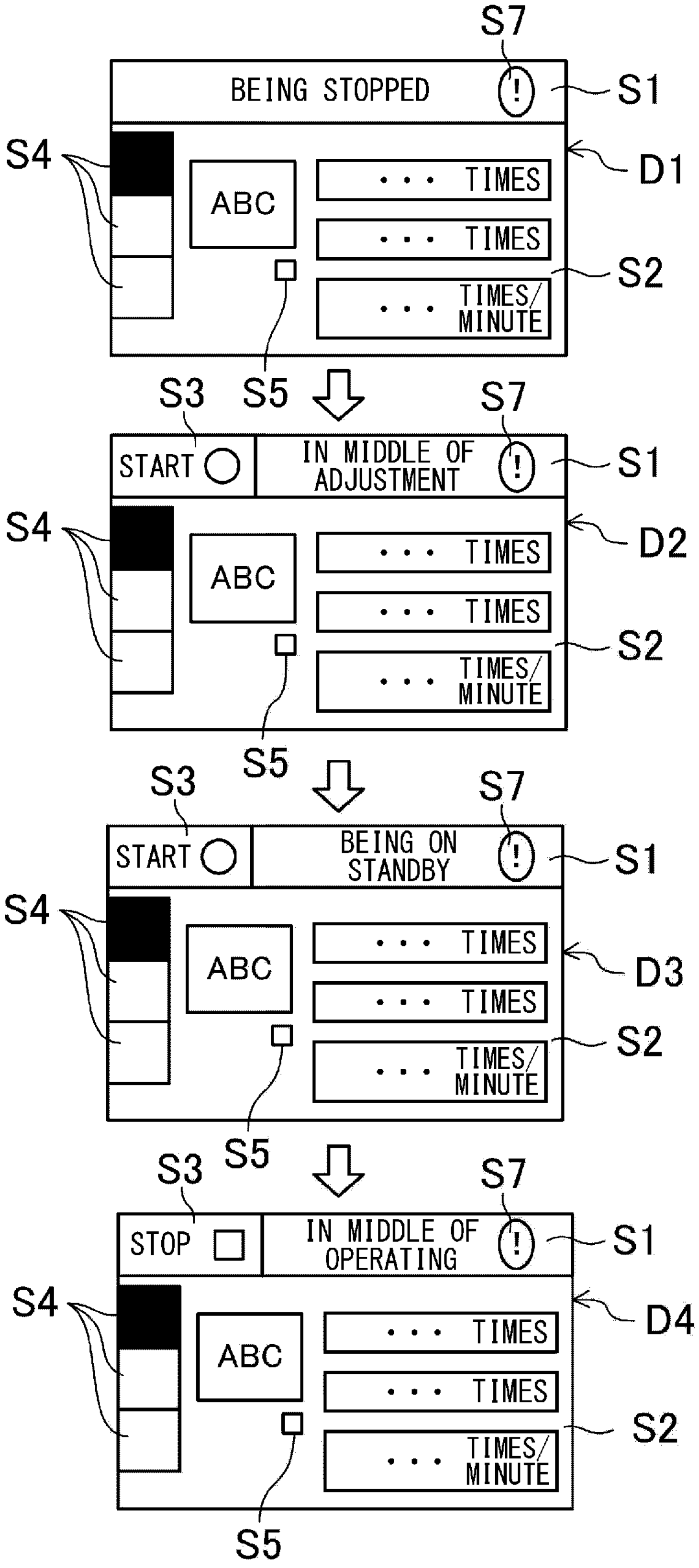
FIG. 5A is a diagram for describing a screen transition of a display section.

As illustrated in FIG. 5A, in the display control section 105 according to this embodiment, a layout of the display elements S1 to S4 is shared among the adjustment screen D2, the standby screen D3, and the operating screen D4. For example, a display mode (particularly, a content of a character string to be displayed) of the status bar S1, presence or absence of the switch button S3 and a display mode thereof, and a display mode of the menu button S4 are different among the four types of screens D1 to D4.

—Switch Button S3—

As illustrated in FIG. 5A, the switch button S3 is displayed, for example, at a corner of the screen of the display section 102. The switch button S3 is configured to receive an operation of a pointing device, a touch operation, or the like, and is displayed as "stop" on the operating screen D4, so that the operating state can be switched to the standby state by operating the button S3. On the other hand, the switch button S3 is displayed as "start" on the standby screen D3, and the standby state can be switched to the operating state by operating the button S3.

—Menu Button S4—

The menu button S4 is a display item common among the four types of screens D1 to D4 described above.

Specifically, the menu button S4 according to this embodiment includes, for example, a plurality of buttons arranged side by side in the vertical direction. Each of the buttons is configured to receive an operation of a pointing device, a touch operation, and the like. Menu items corresponding to display contents of the main display section S2, such as "home", "job", "setting", and "examination", are displayed on the respective buttons (see, for example, the operating screen D4 illustrated in FIG. 11).

—Main Display Section S2—

The main display section S2 is a display item common among the four types of screens D1 to D4 described above.

Specifically, in a state where "home" is selected in the menu button S4, a home display for displaying an operation situation of the laser marking system S is displayed on the main display section S2. In this home display, it is possible to display a display field indicating a content (in the illustrated example, upper case "ABC") of the print job Pj, the number of times of printing accumulated after the start of use of the laser marking apparatus L (cumulative number of times of printing), the number of times of printing accumulated after switching to the current print job Pj (number of times of job printing), and the number of times of printing per minute (printing throughput). The home display can be regarded as a progress screen indicating a progress situation of marking on the workpiece W.

In addition, a switching interface S5 is displayed on the screen in a state where "home" is selected in the menu button S4, and a display mode can be switched between a preview enlargement mode in which the content of the print job Pj is enlarged and displayed (see the lower diagram of FIG. 5B) and a monitor enlargement mode in which display fields of the cumulative number of times of printing, the number of times of job printing, and the printing throughput are enlarged and displayed (see the upper diagram of FIG. 5B) by operating the switching interface S5.

Figure 5B:
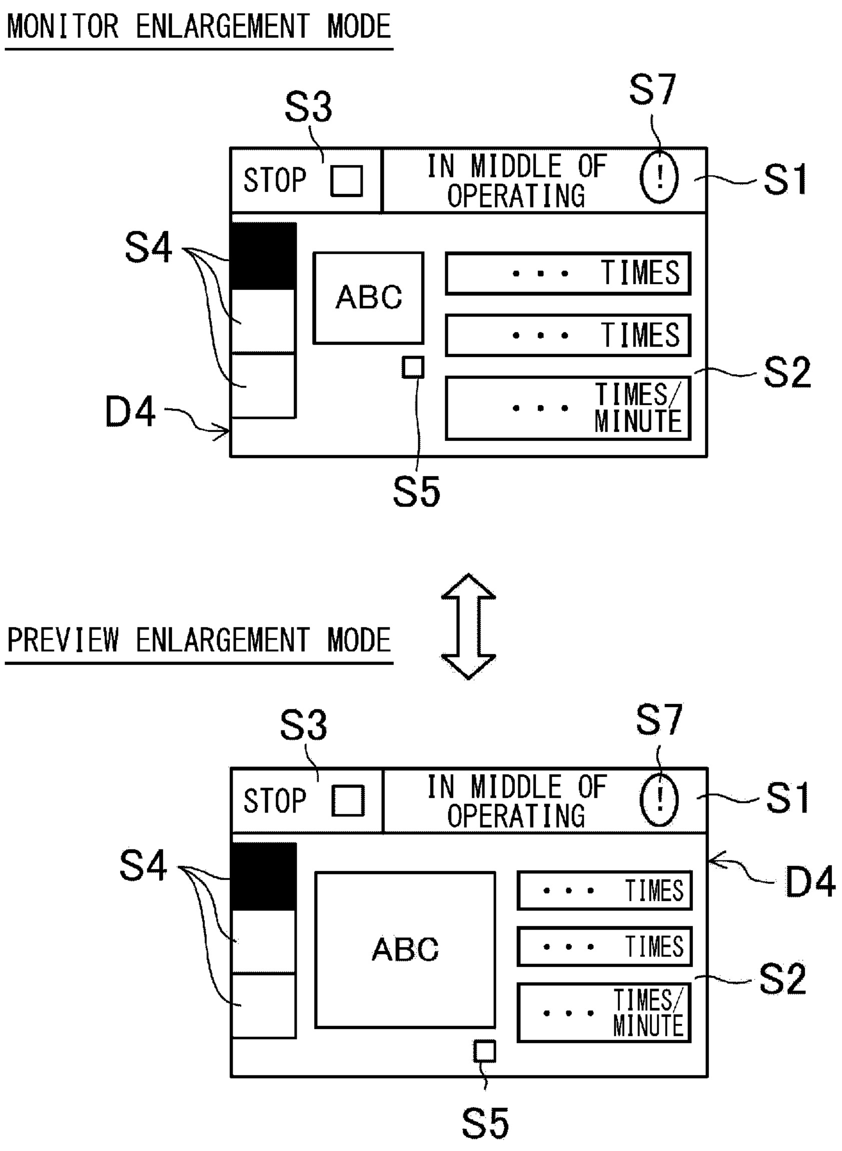
FIG. 5B is a diagram for describing the screen transition of the display section.
Figure 5C:
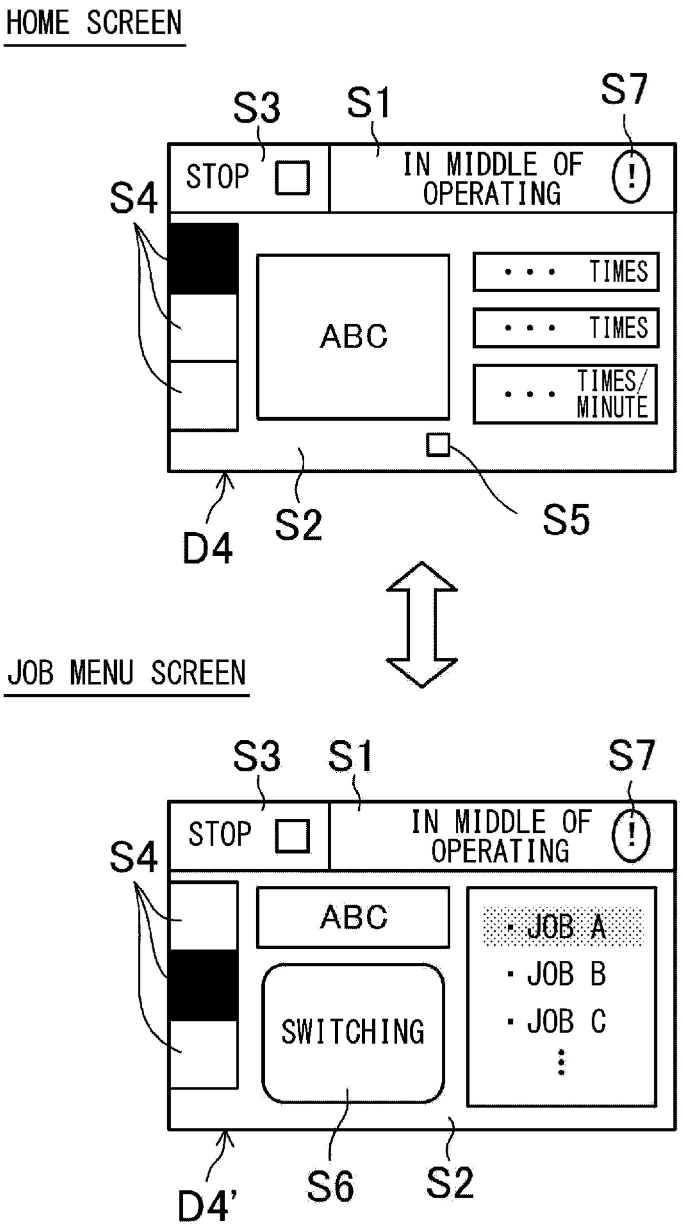
FIG. 5C is a diagram for describing the screen transition of the display section.

On the other hand, in a state where "job" is selected in the menu button S4, a job menu as illustrated in a screen D4' of FIG. 5C is displayed on the main display section S2. In this job menu, it is possible to display a display field configured to display a list of the respective print jobs Pj, such as "job A", "job B", and "job C", and be capable of selecting one print job Pj, a switch button S6 for executing switching to the selected print job Pj, and a display field indicating a content of the selected print job Pj.

In addition, although not illustrated in FIG. 5C, it is also possible to directly cause a transition from the job menu to a setting screen $D4_5$ of job information in the selected print job Pj, a setting screen of the print block Pb in the selected print job Pj, a print test screen $D4_6$ of the selected print job Pj, or the like.

In addition, it is also possible to display a setting screen for communication, a date, and the like of the laser marking apparatus L on the main display section S2 by selecting the "setting" item, and to display a screen for confirming a log, operational information, and the like of the laser marking apparatus L on the main display section S2 by selecting the "examination" item.

—Status Bar S1—

The status bar S1 is a display item common among the four types of screens D1 to D4 described above.

Specifically, the status bar S1 according to this embodiment can display "being stopped" in the stopped state, "in the middle of adjustment" in the adjustment state, "being on standby" in the standby state, and "in the middle of operating" in the operating state as illustrated in FIG. 5A, for example.

Note that a required time (estimated value) required for the adjustment may be displayed on the status bar S1 together with the display of "in the middle of adjustment" as illustrated in FIG. 6. In addition, when the switch button S3 is operated while "in the middle of adjustment" is displayed, the display of "in the middle of adjustment" may be switched to "in the middle of preparation for operating", and at the same time, a display content of the switch button S3 may be switched from "start" to "stop" (hereinafter, this state is also referred to as an "operating preparation state").

<Operation Example of Laser Marking System S>

Figure 7:
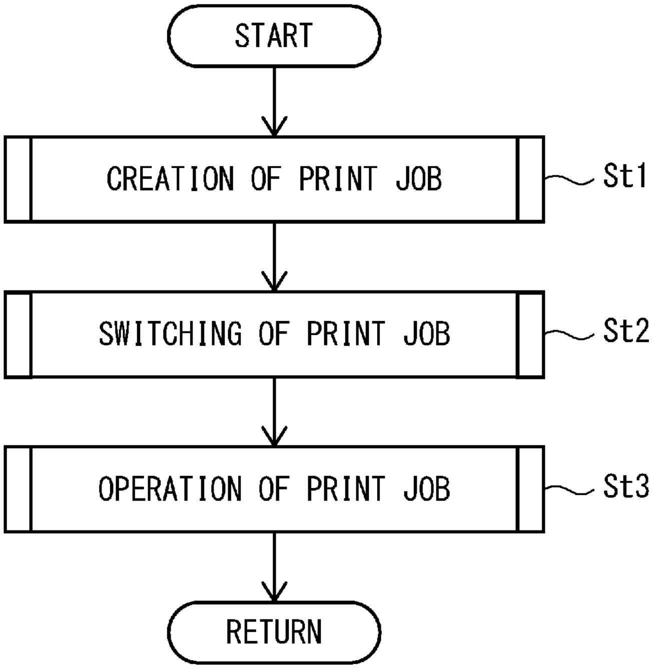
FIG. 7 is a flowchart illustrating processing performed during operation of the laser marking system.

FIG. 7 is a diagram obtained by expressing processing, performed at the time of operating the laser marking system S, as a flowchart focused on the print job Pj. As illustrated in FIG. 7, creation of the print job Pj (step St1), switching of the print job Pj (step St2), and operation of the print job Pj (step St3) are mainly performed during the operation of the laser marking system S.

Hereinafter, details of the processing related to these steps and specific examples of display screens of the display section 102 in the respective steps will be described.

In actual operation, prior to step St1, the laser marking apparatus Lis powered on, and an operation of turning on the key switch or the like is performed. As these steps are performed, a display content of the display section 102 transitions in the order of the stop screen D1, the adjustment screen D2, the standby screen D3, and the operating screen D4 or D4' described above unless an interlock state or a trouble state is formed.

Figure 11:
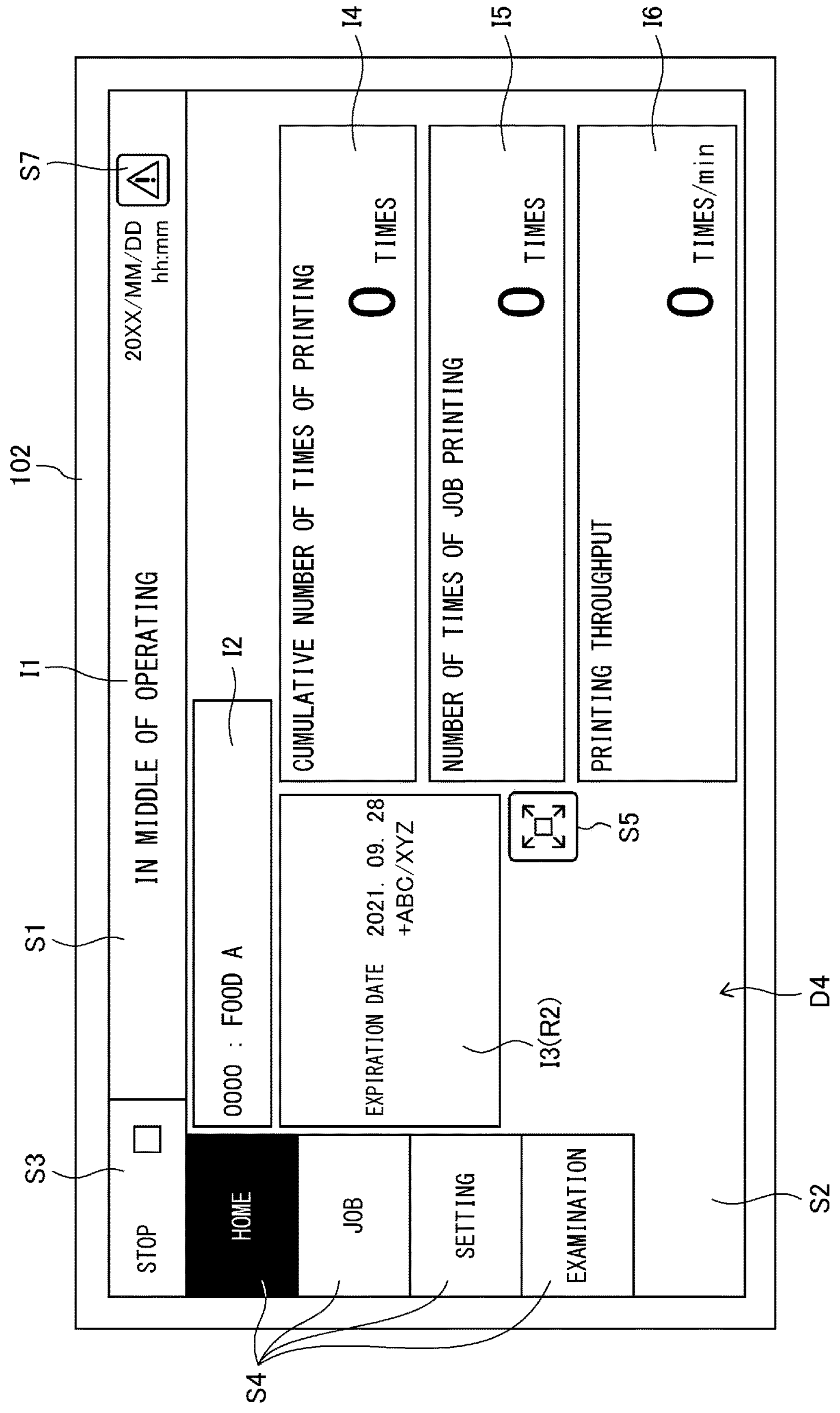
FIG. 11 is a diagram illustrating a display mode of a home screen.
Figure 12:
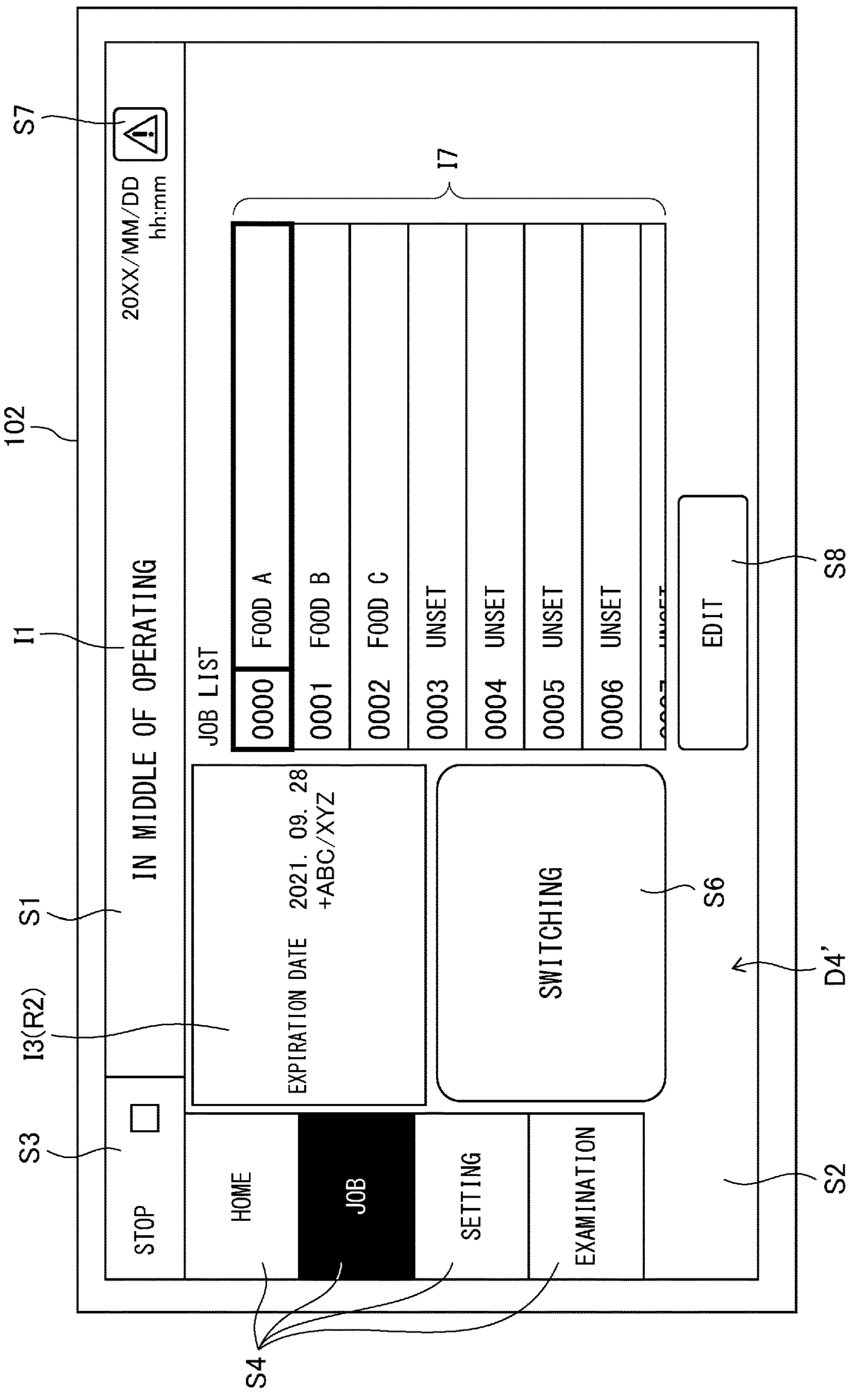
FIG. 12 is a diagram illustrating a display mode of a job menu screen.

As illustrated in FIGS. 5A and 5B and the like, the operating screens D4 and D4' can be switched between the operating screen D4 set to the home display as illustrated in FIG. 11 and the operating screen D4' set to the job menu as illustrated in FIG. 12 as main display modes. As described above, this switching can be executed by performing a click operation, a touch operation, or the like on the menu button S4. Hereinafter, the operating screen D4 set to the home display may be simply referred to as a "home screen D4", and the operating screen D4' set to the job menu may be referred to as a "job menu screen D4".

Specifically, the home screen D4 displays the status bar S1, the main display section S2, the switch button S3, and the menu button S4 as main display items as illustrated in FIG. 11. These display items are shared by all screens to be described later.

On the status bar S1 on the home screen D4, a first display item I1 indicating a current state of the laser marking apparatus L and a notification mark S7 are displayed.

In addition, the main display section S2 of the same operating screen D4 displays the above-described switching interface S5, a second display item I2 that displays a job ID (for example, "0000") for identifying a print job Pj and a name (for example, "food A") of the print job Pj, and a third display item I3 that visually displays character strings of a plurality of print blocks Pb constituting the print job Pj displayed in the second display item I2 and attribute information of each of the print blocks Pb. A display area of the third display item I3 corresponds to the above-described setting plane R2. In this example, the same content as the print job Pj illustrated in FIG. 5 is displayed in the third display item I3.

Further, a fourth display item I4 that displays the above-described cumulative number of times of printing, a fifth display item I5 that displays the number of times of job printing, and a sixth display item I6 that displays the printing throughput are displayed on the main display section S2 of the same operating screen D4. These display contents are sequentially counted up after the start of marking by the laser marking apparatus L.

On the other hand, as illustrated in FIG. 12, the job menu screen D4' displays a list of a plurality of print jobs Pj as main display items, and displays a seventh display item I7 that receives an operation of selecting one print job Pj, the switch button S6 for executing switching to the print job Pj selected in the seventh display item I7, and a job setting button S8 for setting a content of the selected print job Pj.

(Step St1)

Figure 8:
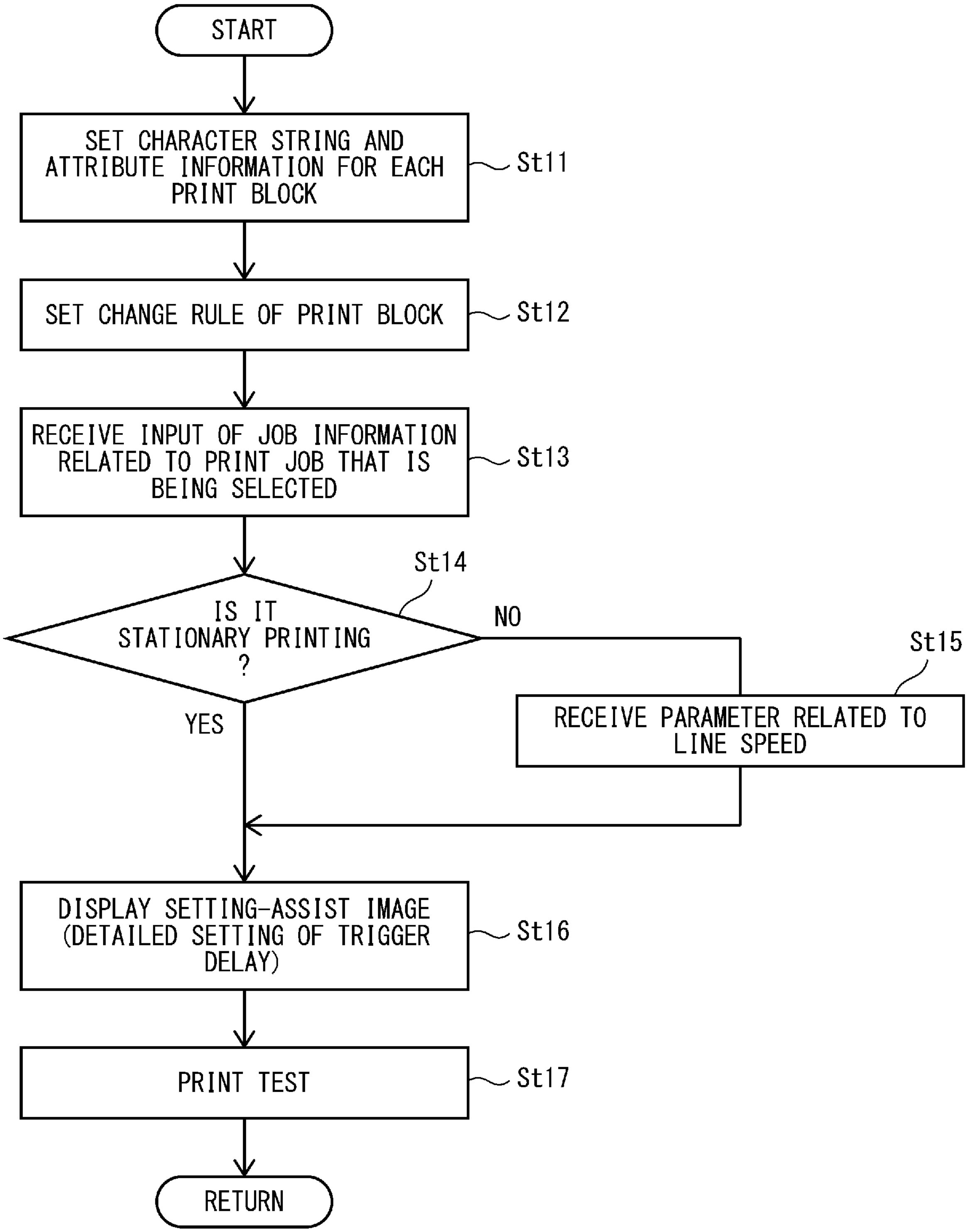
FIG. 8 is a flowchart illustrating processing related to creation of a print job.

FIG. 8 is a flowchart illustrating processing related to the creation of the print job Pj, and is a diagram illustrating details of step St1 of FIG. 7. That is, step St1 of FIG. 7 corresponds to steps St11 to St17 of FIG. 8 expressed as one step.

First, prior to step St11, the home screen D4 illustrated in FIG. 11 is displayed on the display section 102. When the menu button S4 is operated on the home screen D4, the home screen D4 is switched to the job menu screen D4' illustrated in FIG. 12. This switching is configured to be executed by the display control section 105.

Thereafter, when a user input with respect to the job setting button S8 is received in a state where one print job Pj is selected on the job menu screen D4', the display control section 105 causes a transition from the job menu screen D4' to a block selection screen D4" that forms one operating screen similarly to the screen D4'.

Figure 13:
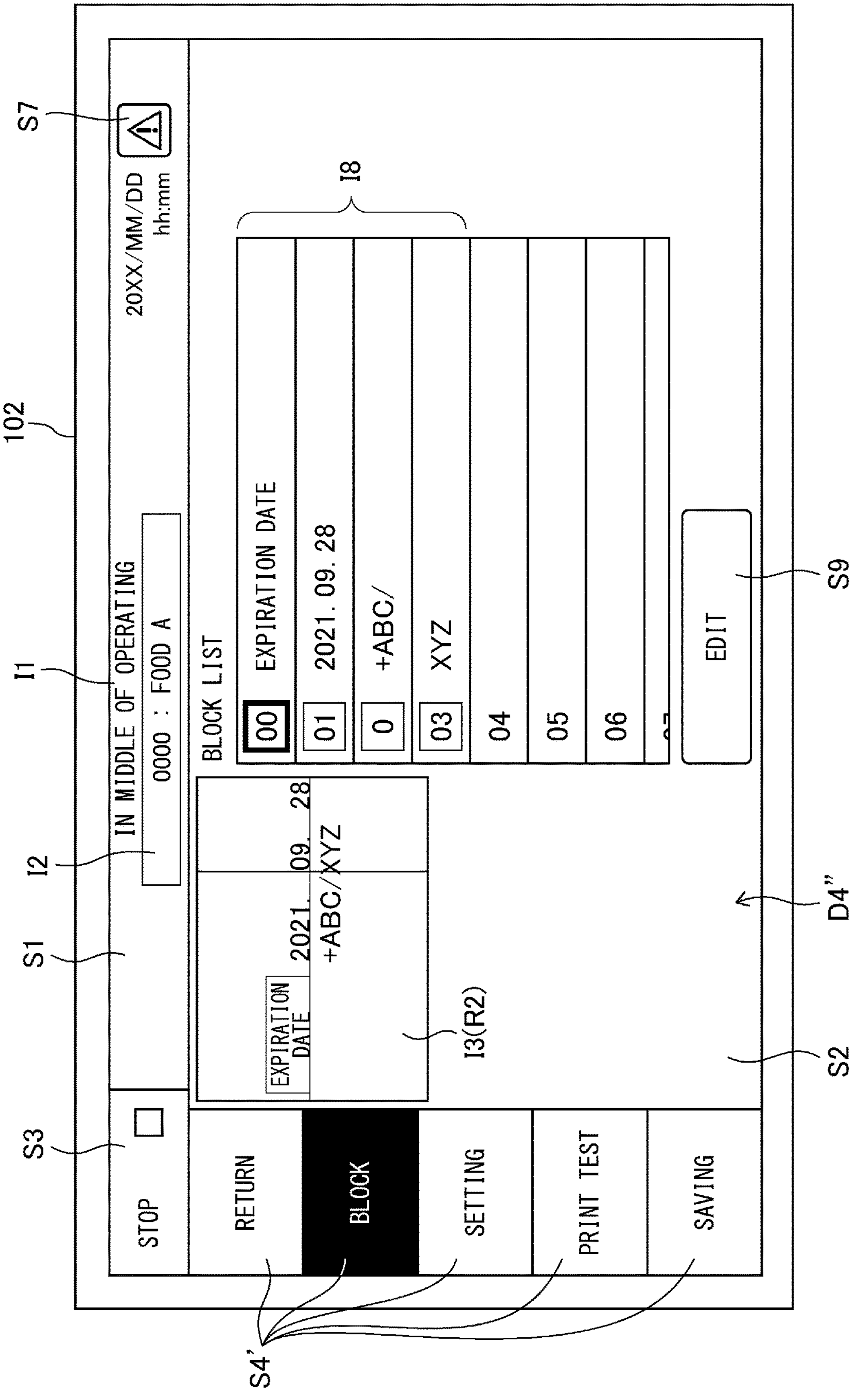
FIG. 13 is a diagram illustrating a display mode of a block selection screen.

As illustrated in FIG. 13, the block selection screen D4" displays, as main display items, a menu button S4', an eighth display item I8 that displays a list of a plurality of print blocks Pb, an eighth display item I8 that receives an operation of selecting one print block Pb, and a block setting button S9 for setting a content of the selected print block Pb.

When a user input with respect to the block setting button S9 is received in a state where one print block Pb is selected on the block selection screen D4", the display control section 105 causes a transition from the block selection screen D4" to a job editing screen D43 that forms one operating screen similarly to the same screen D4".

—Step St11—

In step St11 of FIG. 8, the setting section 103 and the reception section 104 set a content of a character string and attribute information of the character string for each of the print blocks Pb based on the user input with respect to the job editing screen D43.

As illustrated in FIG. 14, the job editing screen D43 displays, as main display items, a first switching tab I9 that causes a transition to a setting screen for changing the character string of the selected print block Pb, a second switching tab 110 that causes a transition to a setting screen for determining a layout of the print block Pb, and a third switching tab I11 that causes a transition to a setting screen for inputting other detailed settings. The job editing screen D43 illustrated in FIG. 14 corresponds to a state in which the first switching tab I9 is selected. In addition, a completion button S10 on the job editing screen D43 is a button operated when editing of the print job Pj is completed.

In addition, the job editing screen D43 displays a twelfth display item I12 that receives an operation of switching to another print block Pb, a thirteenth display item I13 that receives an operation of selecting a format of the currently selected print block Pb, and a fourteenth display item I14 that receives an operation of changing the character string of the print block Pb according to the format selected via the thirteenth display item I13.

For example, when fourteenth display item I14 is operated in a case where the "date" is selected in the thirteenth display item I13, the display control section 105 displays a calendar on the display section 102. The setting section 103 and the reception section 104 can set a "date" as a character string based on a user input to the calendar.

When receiving the user inputs for the twelfth display item I12 to the fourteenth display item I14, the setting section 103 and the reception section 104 can newly set the character string of the print block Pb and change a setting content thereof afterwards.

In addition, the job editing screen D43 displays a fifteenth display item I15 that receives an operation of setting a size of the character string of the currently selected print block Pb, a sixteenth display item I16 that receives an operation of setting a character width of the character string, a seventeenth display item I17 and an eighteenth display item I18 that receive an operation of setting parameters related to an arrangement of the character string such as a character interval, and a nineteenth display item I19 that receives an operation of setting a thickness of the character string.

When receiving the user inputs for the fifteenth display item I15 to the nineteenth display item I19, the setting section 103 and the reception section 104 can newly set the attribute information of the print block Pb and change a setting content thereof afterwards.

—Step St12—

In step St12 of FIG. 8, the setting section 103 and the reception section 104 set the setting of the change rule Cl described with reference to FIG. 4 and other details for each of the print blocks Pb based on user inputs on a detailed setting screen D44.

Figure 15:
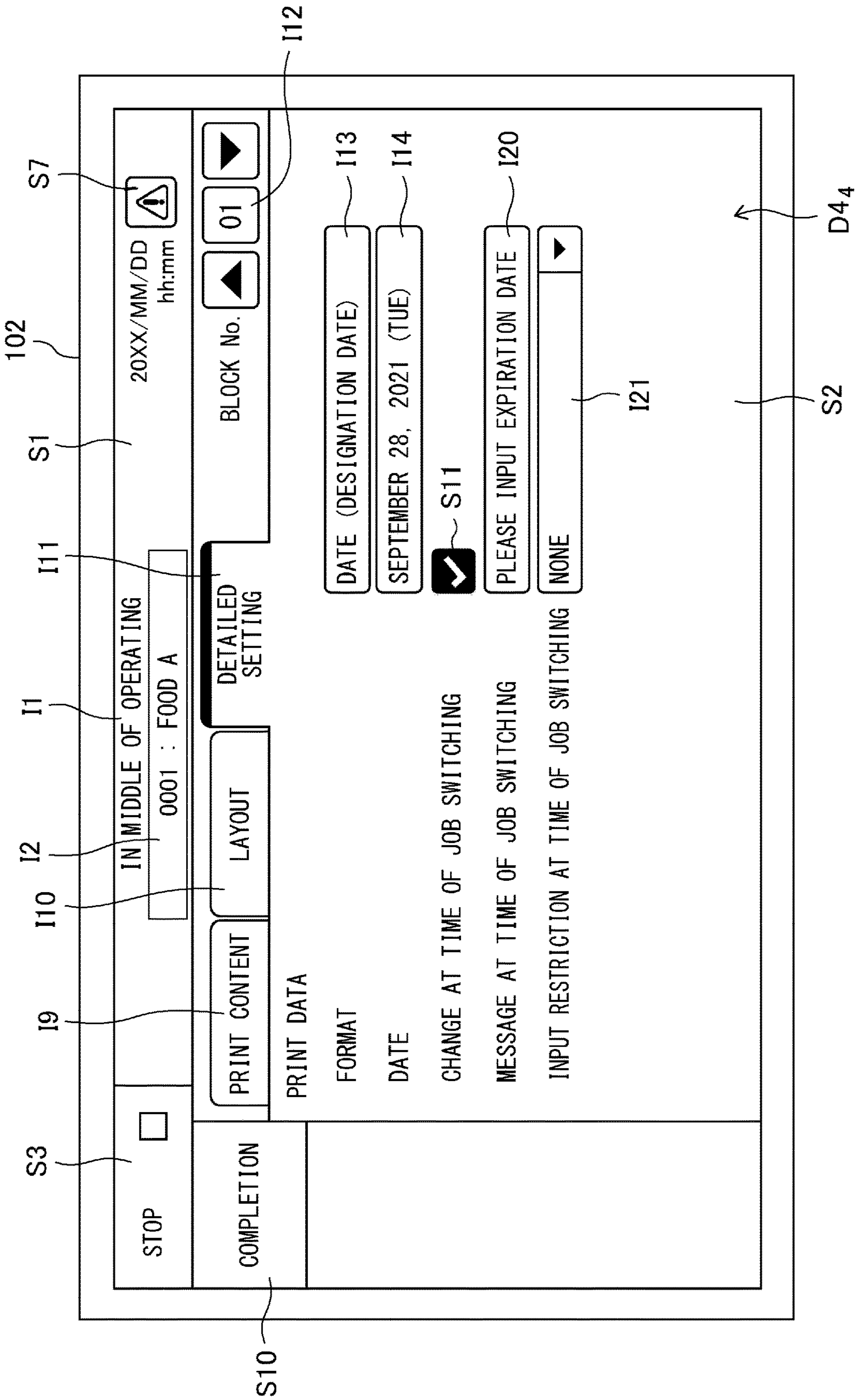
FIG. 15 is a diagram illustrating a display mode of a detailed setting screen.

As illustrated in FIG. 15, the detailed setting screen D44 displays a rule switching button S11 that individually switches whether or not to permit a setting change of a character string at the time of job switching for each of the print blocks Pb. The setting section 103 can individually set the change rule Cl for each of the print blocks Pb based on a user input to the rule switching button S11. For example, the state illustrated in FIG. 15 corresponds to a state in which the setting change is permitted.

In addition, the detailed setting screen D44 includes a twentieth display item I20 that receives an input of a message that needs to be displayed on the display section 102 when the setting of the print block Pb is changed at the time of job switching, and a twenty-first display item I21 for setting an input restriction of a character string in the setting change, such as whether or not only an input of a number needs to be received at that time.

When the message is input in advance through the twentieth display item I20, for example, it is possible to prompt the user to perform an appropriate setting change at the time of job switching.

Thereafter, when a user input to the completion button S10 is received, the setting section 103 and the reception section 104 complete settings related to each of the print jobs Pj, each of the print blocks Pb, and switching of the print job Pj. The settings performed in this manner are stored in the storage apparatus 120 for each of the print jobs Pj. With the completion of the settings, the display control section 105 causes a transition from the detailed setting screen D44 to a job information setting screen $D4_5$ for setting the above-described job information such as the setting related to the conveyance of the workpiece W. With this transition, a control process illustrated in FIG. 8 proceeds from step St12 to step St13.

—Step St13 to Step St15—

In step St13 of FIG. 8, the setting section 103 and the reception section 104 set job information for the print job Pj that is being selected on the job menu screen D4' based on a user input on the job information setting screen $D4_5$. The job information setting screen $D4_5$ visually illustrates a setting-assist image Pa to be described later, and can be regarded as a "first setting screen" in this embodiment.

Figure 16:
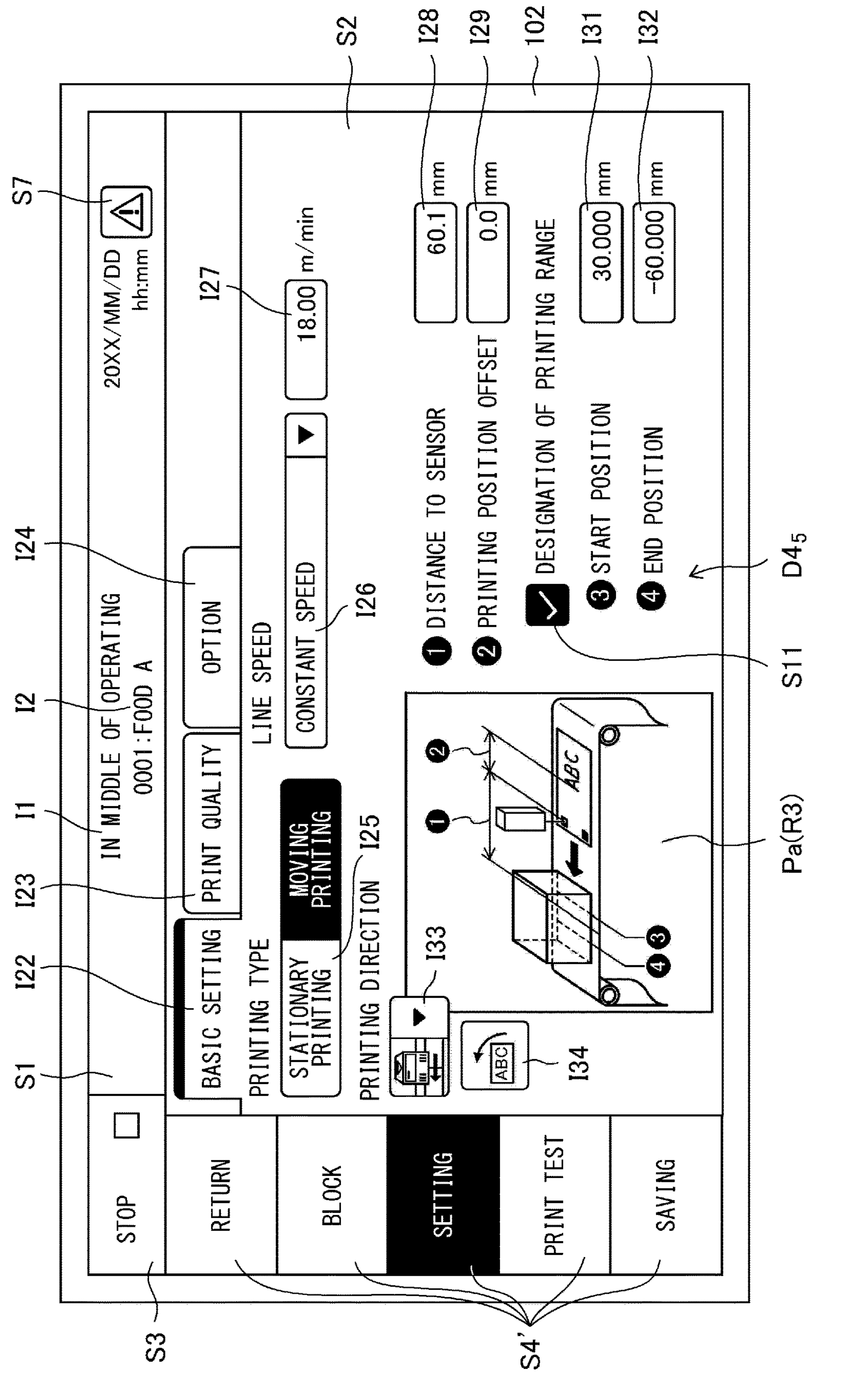
FIG. 16 is a diagram illustrating a display mode of a job information setting screen.

As illustrated in FIG. 16, the job information setting screen $D4_5$ includes, as main display items, a fourth switching tab I22 that causes a transition to the first job information setting screen $D4_5$ for defining a basic setting of the job information, a fifth switching tab I23 that causes a transition to a second job information setting screen $D4_5'$ for setting print quality of the print job Pj that is being selected, and a sixth switching tab I24 that causes a transition to a third job information setting screen $D4_5''$ for defining other option settings. The job information setting screen $D4_5$ illustrated in FIG. 16 corresponds to a state in which the fourth switching tab I22 is selected.

As illustrated in FIG. 16, the first job information setting screen $D4_5$ displays, as main display items, a twenty-fifth display item I25 that switches, for each of the print jobs Pj, whether to operate the print job Pj that is being selected in stationary printing or in moving printing, a twenty-sixth display item I26 that switches a setting of a line speed (conveyance speed of the workpiece W) in a case where the moving printing is selected, and a twenty-seventh display item I27 that receives a user input of the line speed in a case where the line speed is set to "constant speed". The twenty-sixth display item I26 and the twenty-seventh display item I27 are displayed on the display section 102 only when the moving printing is selected.

As described above, the movement amount monitoring section 110 monitors whether or not the movement amount of the workpiece W after the reception has reached the trigger delay Of every time the trigger signal is received. It is necessary to input the line speed to the marker controller 100 in advance in order to accurately perform such monitoring when the moving printing has been selected.

Therefore, in step St14 subsequent to step St13, the marker controller 100 determines whether or not the movement printing is selected, and advances the control process from step St14 to step St15 to display a user interface for inputting the line speed, such as the twenty-sixth display item I26 and the twenty-seventh display item I27, on the display section 102 when the moving printing is selected. On the other hand, when it is determined in step St14 that moving printing is not selected, the marker controller 100 skips step St15 and advances the control process to step St16.

Here, as methods of setting the line speed, a method (first setting method) of directly inputting the speed, a method (second setting method) based on the number of times of marking per predetermined time (film rotation speed), and a method (third setting method) based on the above-described number of output pulses of the encoder 401 are conceivable.

The marker controller 100 according to this embodiment is configured to be capable of switching between the three setting methods. This switching can be performed as the marker controller 100 receives a user input to the twenty-sixth display item I26 illustrated in FIG. 16.

Figure 17:
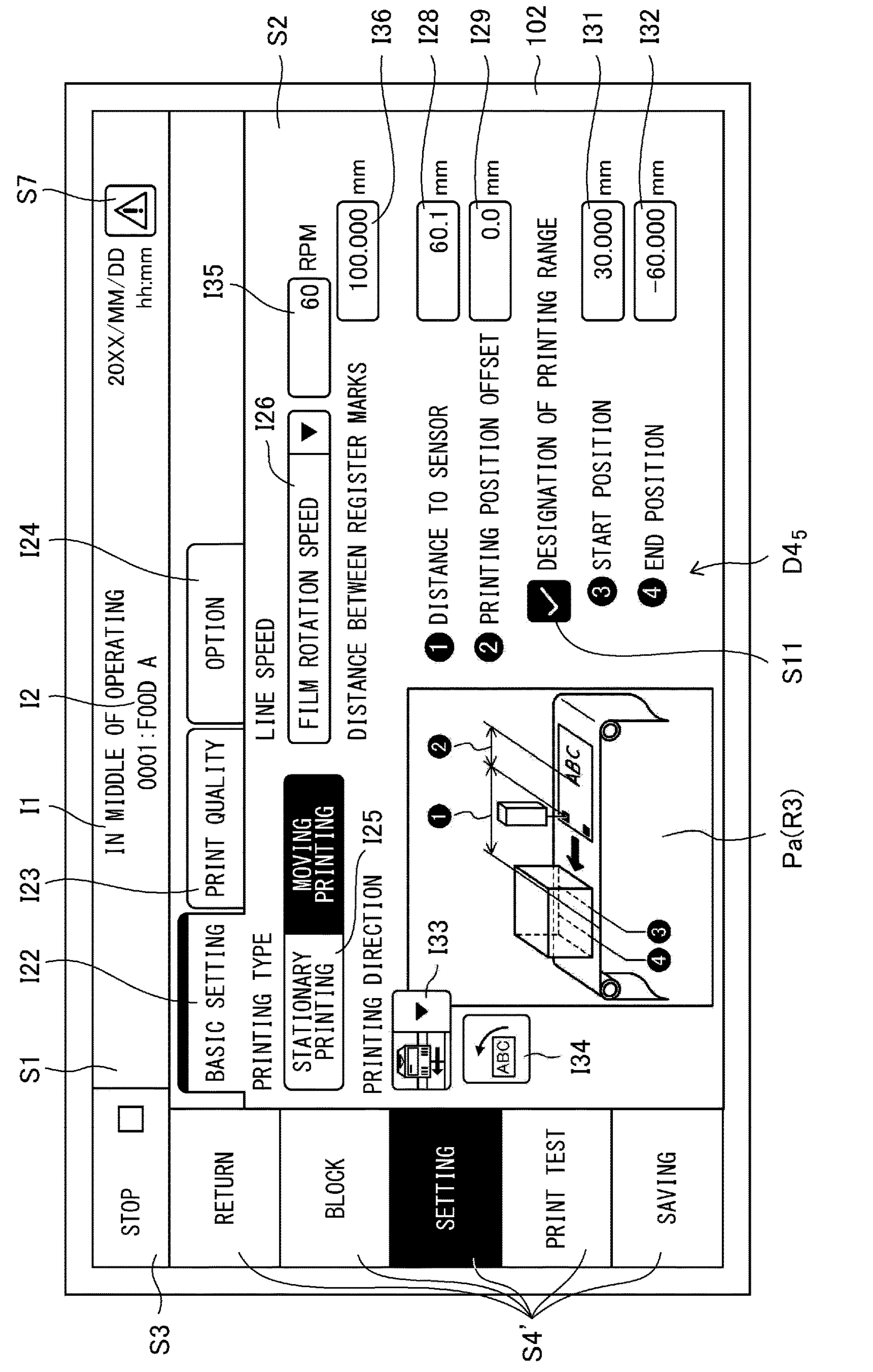
FIG. 17 is a diagram illustrating a display mode of the job information setting screen.
Figure 18:
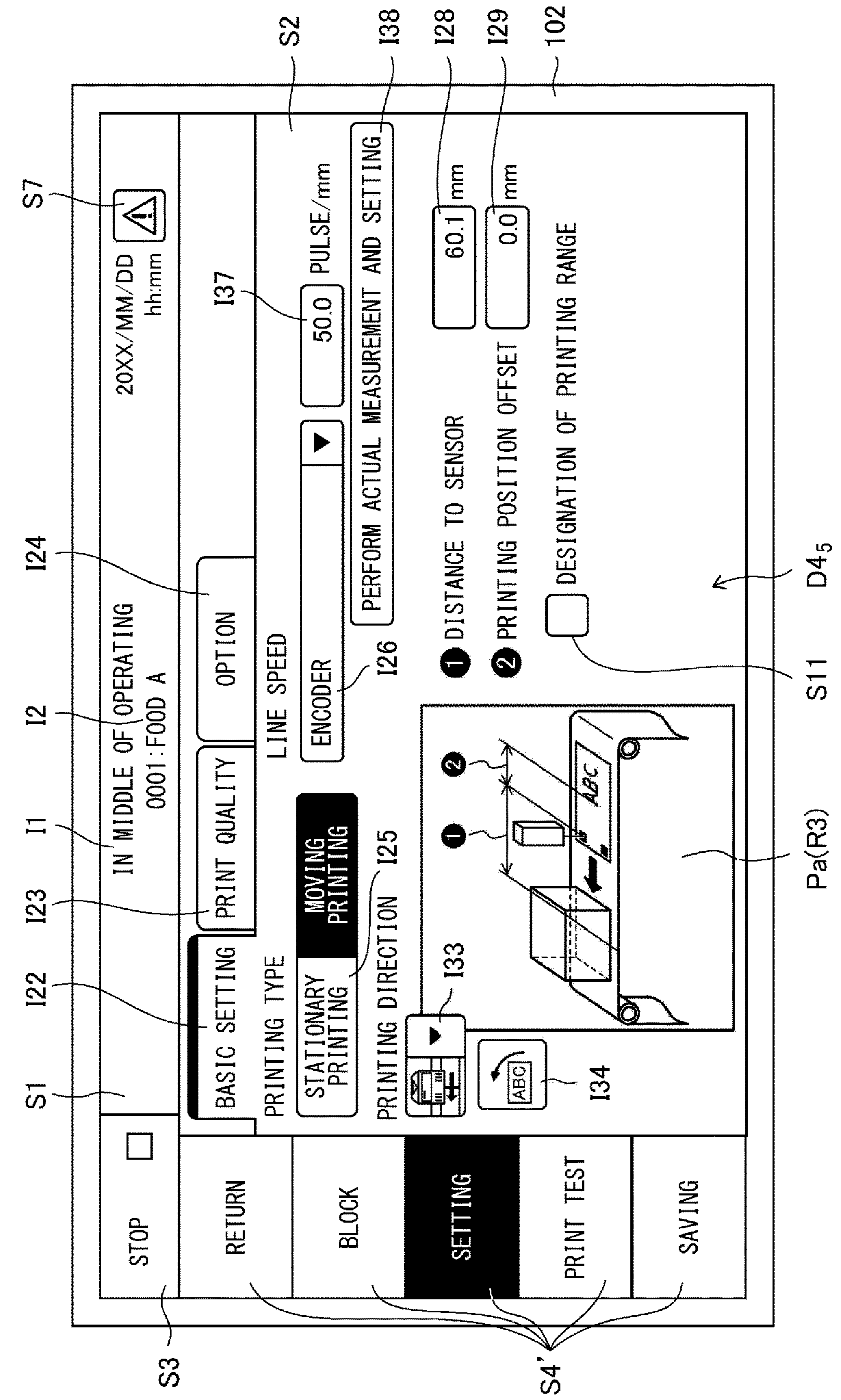
FIG. 18 is a diagram illustrating a display mode of the job information setting screen.

Specifically, the twenty-sixth display item I26 is configured as a so-called scroll bar, and can select any one of "constant speed" as illustrated in FIG. 16, "film rotation speed" as illustrated in FIG. 17, and "encoder" as illustrated in FIG. 18.

(1) First Setting Method

The first setting method corresponds to a state in which "constant speed" is selected in the twenty-sixth display item I26. In this case, the display control section 105 causes the display section 102 to display the twenty-seventh display item I27 as an interface for receiving a user input for the line speed (see FIG. 16). Note that a unit of [m/min] in FIG. 16 is an example.

In this case, the movement amount monitoring section 110 can calculate the movement amount of the workpiece W through the following arithmetic operation.

Movement amount of workpiece *W* [mm]=Line speed [m/min]·Elapsed time after reception of trigger signal [s]·1000/60 (A)

Further, a marking start timing can be controlled based on whether or not the calculated movement amount has reached the trigger delay Of described above. Specifically, every time the trigger signal is received, the movement amount monitoring section 110 can count an elapsed time after the reception of the trigger signal and determine whether or not the movement amount of the workpiece W has reached the trigger delay Of based on the elapsed time. The count of the elapsed time may be reset every time the trigger signal is received.

At that time, the elapsed time serving as a determination reference may be calculated in advance and stored in the storage apparatus 120 by calculating the above formula (A) back for the elapsed time. In such a case, it is possible to determine whether or not the movement amount of the workpiece W has reached the trigger delay Of based on whether or not the elapsed time has reached the determination reference.

(2) Second Setting Method

The second setting method corresponds to a state in which the "film rotation speed" is selected. In this case, the display control section 105 causes the display section 102 to display a thirty-fifth display item I35 as an interface for receiving a user input for the film rotation speed. Note that a unit of "RPM" in FIG. 17 is an example. For example, when marking is performed on 50 workpiece elements We per minute, the film rotation speed is 50 [RPM]. In addition, the "film rotation speed" referred to herein does not correspond to the rotation speed of the conveyance roller 502 or the like, but corresponds to the number of times of marking per predetermined time.

When the "film rotation speed" is selected, the display control section 105 further displays a thirty-sixth display item I36 on the display section 102 as an interface for receiving a user input for an interval (mark interval) Im of the alignment marks Mr illustrated in FIG. 6. Note that a unit of [mm] in FIG. 16 is an example.

In this case, the movement amount monitoring section 110 can calculate the movement amount of the workpiece W through the following arithmetic operation.

Movement amount of workpiece *W* [mm]=Film rotation speed [$min^{-1}$]·Mark interval [mm]·Elapsed time after reception of trigger signal [s]/60 (B)

Further, a marking start timing can be controlled based on whether or not the calculated movement amount has reached the trigger delay Of described above. Specifically, every time the trigger signal is received, the movement amount monitoring section 110 can count an elapsed time after the reception of the trigger signal and determine whether or not the movement amount of the workpiece W has reached the trigger delay Of based on the elapsed time. The count of the elapsed time may be reset every time the trigger signal is received.

At that time, the elapsed time serving as a determination reference may be calculated in advance and stored in the storage apparatus 120 by calculating the above formula (B) back for the elapsed time. In such a case, it is possible to determine whether or not the movement amount of the workpiece W has reached the trigger delay Of based on whether or not the elapsed time has reached the determination reference.

(3) Third Setting Method: Basic Concept

The third setting method corresponds to a state in which the "encoder" is selected. In this case, the display control section 105 causes the display section 102 to display a thirty-seventh display item I37 as an interface for receiving a user input of the above-described number of output pulses. Note that a unit of "pulse/mm" in FIG. 17 is an example. For example, in a case where 50 encoder pulses are output while the workpiece W moves by 1 mm, the number of output pulses is 50 [pulses/mm].

In this case, the movement amount monitoring section 110 can calculate the movement amount of the workpiece W through the following arithmetic operation.

Movement amount of workpiece *W* [mm]=Number of input pulses [pulses]/Number of output pulses [pulses/min] counted after reception of trigger signal (C)

Here, "number of input pulses counted after reception of trigger signal" indicates the number of pulses input to the marker controller 100 after reception of the trigger signal. The count of the number of pulses may be reset every time the trigger signal is received.

Further, a marking start timing can be controlled based on whether or not the calculated movement amount has reached the trigger delay Of described above. Specifically, every time the trigger signal is received, the movement amount monitoring section 110 can count the number of pulses input after the reception of the trigger signal and determine whether or not the movement amount of the workpiece W has reached the trigger delay Of based on the counted number.

At that time, the number of input pulses serving as a determination reference may be calculated in advance and stored in the storage apparatus 120 by calculating the above formula (C) back for the number of input pulses. In this case, it is possible to determine whether or not the movement amount of the workpiece W has reached the trigger delay Of based on whether or not the number of input pulses has reached the determination reference.

(4) Third Setting Method: Automatic Setting

Meanwhile, the number of output pulses needs to be input in order to implement the third setting method, but there may be a case where this parameter is unknown. In this case, the user needs to set the number of output pulses by repeating trial and error, and there is room for improvement in usability.

Therefore, the display control section 105 according to this embodiment is configured to cause the display section 102 to display a user interface W1 for automatically setting the number of output pulses. The user interface W1 is displayed by receiving a tap operation or the like on a thirty-eighth display item I38 in FIG. 18, and is provided in a window format as illustrated in FIG. 19, for example.

Figure 19:
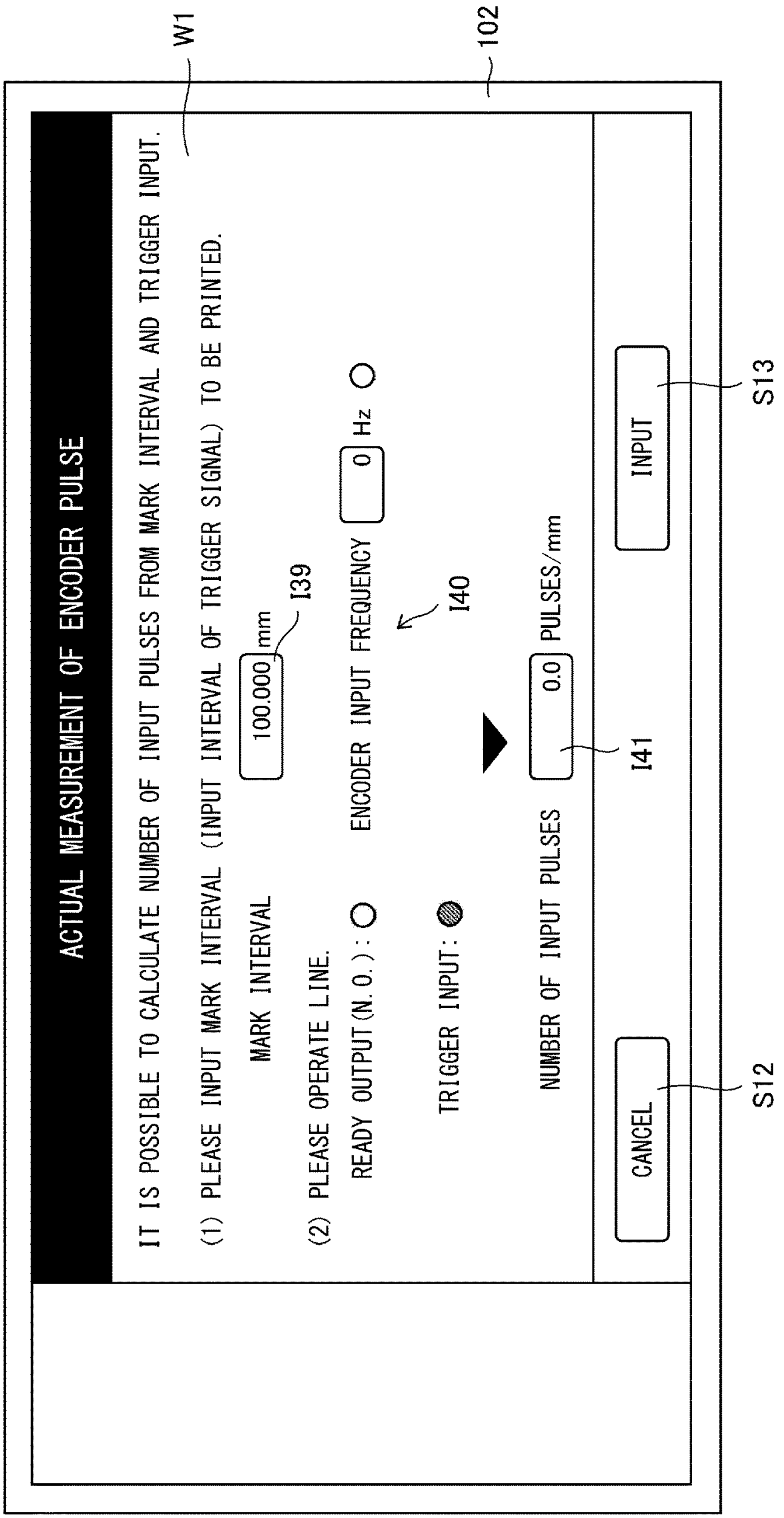
FIG. 19 is a diagram illustrating a user interface for calculating the number of input pulses.

As illustrated in FIG. 19, an input field 139 for the mark interval defined similarly to the second setting method, a selection field 140 for a parameter for calculating the number of output pulses, and a display field 141 displaying a calculation result of the number of output pulses are laid out in the user interface W1.

Here, regarding the mark interval in the input field 139, a value measured by the user using a ruler or the like can be used. On the other hand, regarding the selection field 140, "trigger input" is selected in the state illustrated in FIG. 19. When the workpiece W is conveyed in this state, the marker controller 100 counts the number of encoder pulses in a period (an input interval of the trigger signal) between reception of one trigger signal and reception of the next trigger signal.

In this case, the marker controller 100 can calculate the number of output pulses through the following arithmetic operation Number of output pulses [pulses/mm]=Count of encoder pulses [pulses]/Mark interval [mm] (D)

Here, the display field 141 is updated in real time every time the trigger signal is input. When a tap operation or the like on an input button S13 is received, the marker controller 100 inputs a numerical value displayed in the display field 141 to the input field (thirty-seventh display item I37) for the number of output pulses. When a tap operation or the like on a cancel button S12 is received, the marker controller 100 closes the user interface W1 and returns to the job information setting screen D$4_5$ illustrated in FIG. 18.

In addition, through a tap operation or the like on the selection field 140, the number of encoder pulses can be also counted based on an encoder input frequency, a ready signal, or the like, instead of the input interval of the trigger signal.

When an input of a parameter related to the line speed is received through the first to third setting methods, the marker controller 100 advances the control process to step St16. Note that the order of steps St14 to St16 is merely an example for simplifying the description, and may be changed as appropriate. For example, it may be configured such that the process may proceed to steps St14 to St15 after step St16 is performed, or step St16 may be processed in parallel with steps St14 to St15.

(5) Other Setting Items

Figure 23:
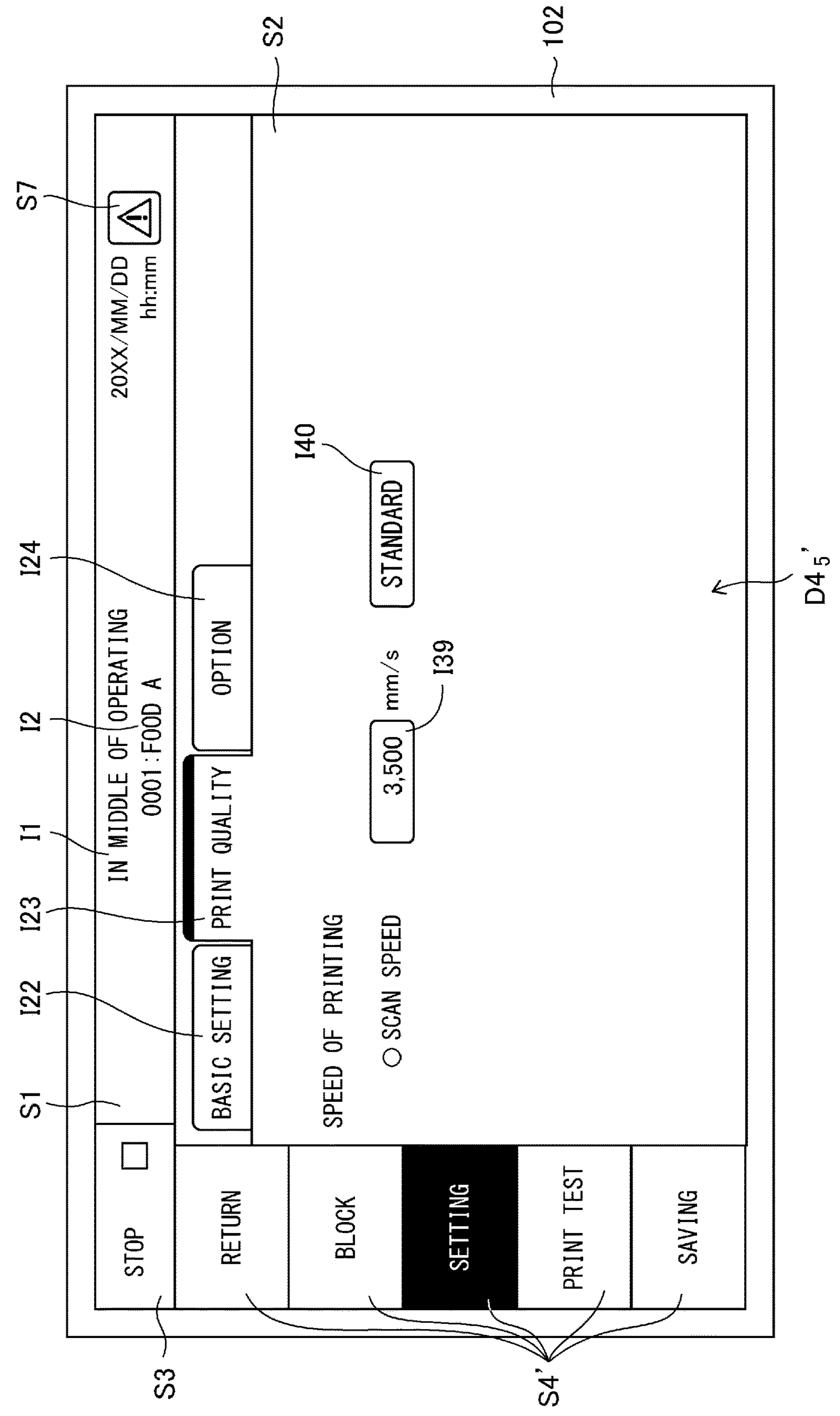
FIG. 23 is a diagram illustrating a display mode of a second job information setting screen.

When receiving an input with respect to the fifth switching tab I23 from the user, the display control section 105 causes the display mode to transition to the second job information setting screen D$4_5$' as illustrated in FIG. 23. The second job information setting screen D$4_5$' is configured to receive an input of print quality including a scanning speed (scan speed) by the laser light scanning section 3, and can be regarded as a "second setting screen" in this embodiment. The setting section 103 is configured to be capable of switching a display content of the display section 102 between the job information setting screen D$4_5$ and the second job information setting screen D$4_5$'.

The second job information setting screen D$4_5$' includes, as main display items, an input field 139 for the scan speed and a standard button 140 for switching the scan speed to a standard setting. In addition, a scroll bar capable of intuitively setting the scan speed may be provided.

—Step St16—

Returning to the description of the job information setting screen D$4_5$, the setting section 103 and the reception section 104 are configured to perform a detailed setting related to the trigger delay Of for the print job Pj being selected on the job menu screen D4' based on a user input with respect to the job information setting screen D$4_5$ in step St16 of FIG. 8.

Meanwhile, the trigger delay Of can be expressed using the first offset amount O1 and the second offset amount O2 as parameters related to the alignment mark Mr and the mark detection sensor 403 as illustrated in FIG. 6.

Although the use of these offset amounts is extremely useful in terms of performing marking corresponding to an actual layout of the alignment mark Mr and the mark detection sensor 403, there is a possibility of being misunderstood by an unfamiliar user, and there is a possibility of causing an erroneous input of a parameter or the like. This is disadvantageous in terms of improving the usability of the laser marking system S.

(1) Basic Concept of Setting-Assist Image

In order to solve such inconvenience, the setting section 103 according to this embodiment causes the display section 102 to display the setting-assist image Pa visually indicating the alignment mark Mr and the offset amount (trigger delay Of) of the flexible workpiece W via the display control section 105. Further, the setting section 103 is configured to receive a user input for setting the trigger delay Of in a state where the setting-assist image Pa is displayed.

As illustrated in FIGS. 16 to 18, an image display area R3 indicating the setting-assist image Pa is set on the job information setting screen D$4_5$. The setting-assist image Pa includes at least a figure visually indicating a position of at least a part (for example, the marker head 1) of the laser marking apparatus L, a figure visually indicating a relative position of the mark detection sensor 403 with respect to the laser marking apparatus L, and a figure visually indicating a relative position of the alignment mark Mr with respect to the workpiece element We.

Specifically, the setting-assist image Pa according to this embodiment includes, as main image elements, a figure (rectangular parallelepiped located immediately above straight lines denoted by "3" and "4") schematically illustrating the marker head 1, figures schematically illustrating the workpiece W and the conveyance roller 502, a figure (a sheet with a character "ABC") schematically illustrating the workpiece element We, a figure (square arranged at a corner of the workpiece element We and filled in black) schematically illustrating the alignment mark Mr, and a figure (rectangular parallelepiped arranged immediately above the alignment mark Mr and denoted by "1") schematically illustrating the mark detection sensor 403.

Here, a distance denoted by "1" in the setting-assist image Pa visually indicates a distance between the mark detection sensor 403 and the housing 10 of the marker head 1, and corresponds to the first offset amount O1 described above. In addition, a distance denoted by "2" in the same image Pa visually indicates a distance between the alignment mark Mr corresponding to each of the workpiece elements We and a marking start position in the workpiece element We, and corresponds to the second offset amount O2 described above.

In order to smoothly set these distances, the setting section 103 according to this embodiment is configured to receive inputs of the distances (the first offset amount O1 and the second offset amount O2) indicated by the setting-assist image Pa. Specifically, the setting section 103 controls the display section 102 via the display control section 105 to cause the display section 102 to display a twenty-eighth display item I28 that receives the input of the first offset amount O1 and a twenty ninth display item 29 that receives the input of the second offset amount O2.

In addition, in general, the marking by the laser light scanning section 3 can be started immediately after the workpiece element We enters the irradiation area R1 in FIG.

1, but it is also conceivable to start the marking after the workpiece element We advances to a predetermined position in the irradiation area R1 in consideration of the print quality and the like. A similar measure can be considered for a timing to end the marking.

In order to meet such needs, the setting-assist image Pa further visually indicates a marking start position in the irradiation area (irradiation range) R1 and a marking end position in the irradiation area R1, and the setting section 103 is configured to receive inputs of the start position and the end position.

Specifically, a distance denoted by "3" in the setting-assist image Pa visually indicates the start position of marking in the irradiation area R1. In addition, a distance denoted by "4" in the same image Pa visually indicates an end position of marking in the irradiation area R1.

In order to smoothly set these positions, the setting section 103 according to this embodiment is configured to receive inputs of a start position and an end position indicated by the setting-assist image Pa. Specifically, by controlling the display section 102 via the display control section 105, the setting section 103 causes the display section 102 to display a thirty-first display item I31 that receives the input of the start position and a thirty-second display item I32 that receives the input of the end position.

In addition, when the check box (rule switching button) S11 illustrated in FIG. 16 or the like receives a tap operation or the like, it is possible to switch between a state in which the start position and the end position are displayed in the setting-assist image Pa and a state in which the start position and the end position are hidden.

For example, in a state where the check box S11 is checked as illustrated in FIGS. 16 and 17, the start position and the end position are visually indicated in the setting-assist image Pa, and at the same time, the thirty-first display item I31 and the thirty-second display item I32 are displayed in the main display section S2.

On the other hand, in a state in which the check box S11 is unchecked as illustrated in FIG. 18, the start position and the end position are hidden in the setting-assist image Pa, and at the same time, the thirty-first display item I31 and the thirty-second display item I32 are hidden in the main display section S2. In this case, the start position and the end position are automatically set to an upper limit value and a lower limit value, respectively. Through this automatic setting, the start position is set to a start point of the irradiation area R1 in the conveyance direction At, and the end position is set to an end point of the irradiation area R1 in the conveyance direction At.

(2) Rotation Display of Setting-Assist Image

In addition, the setting section 103 also causes the display section 102 to display one of a plurality of mutually different setting-assist images Pa, Pa', Pa", Pas as the setting-assist image. Specifically, the setting section 103 displays images obtained by rotating one setting-assist image Pa each by 90° as the plurality of setting-assist images Pa, Pa', Pa", $Pa_3$ (see FIG. 21). In this rotation, the marker head 1 and the flexible workpiece W are integrally rotated. Instead of rotating one setting-assist image Pa by 90°, the setting section 103 may display images obtained by rotating the setting-assist image Pa each by 45° or 30°.

Figure 20:
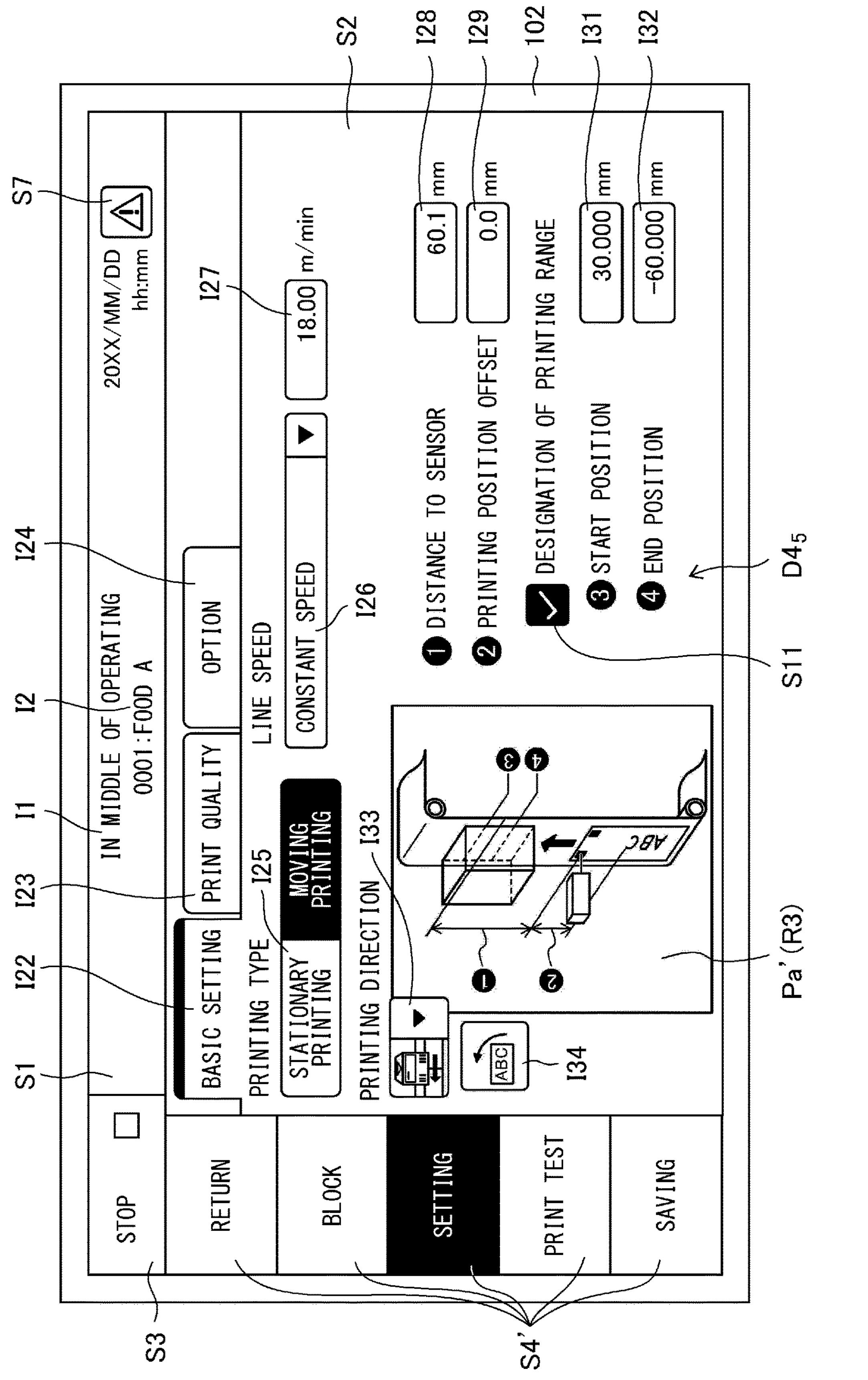
FIG. 20 is a diagram for describing switching of a setting-assist image.
Figure 21:
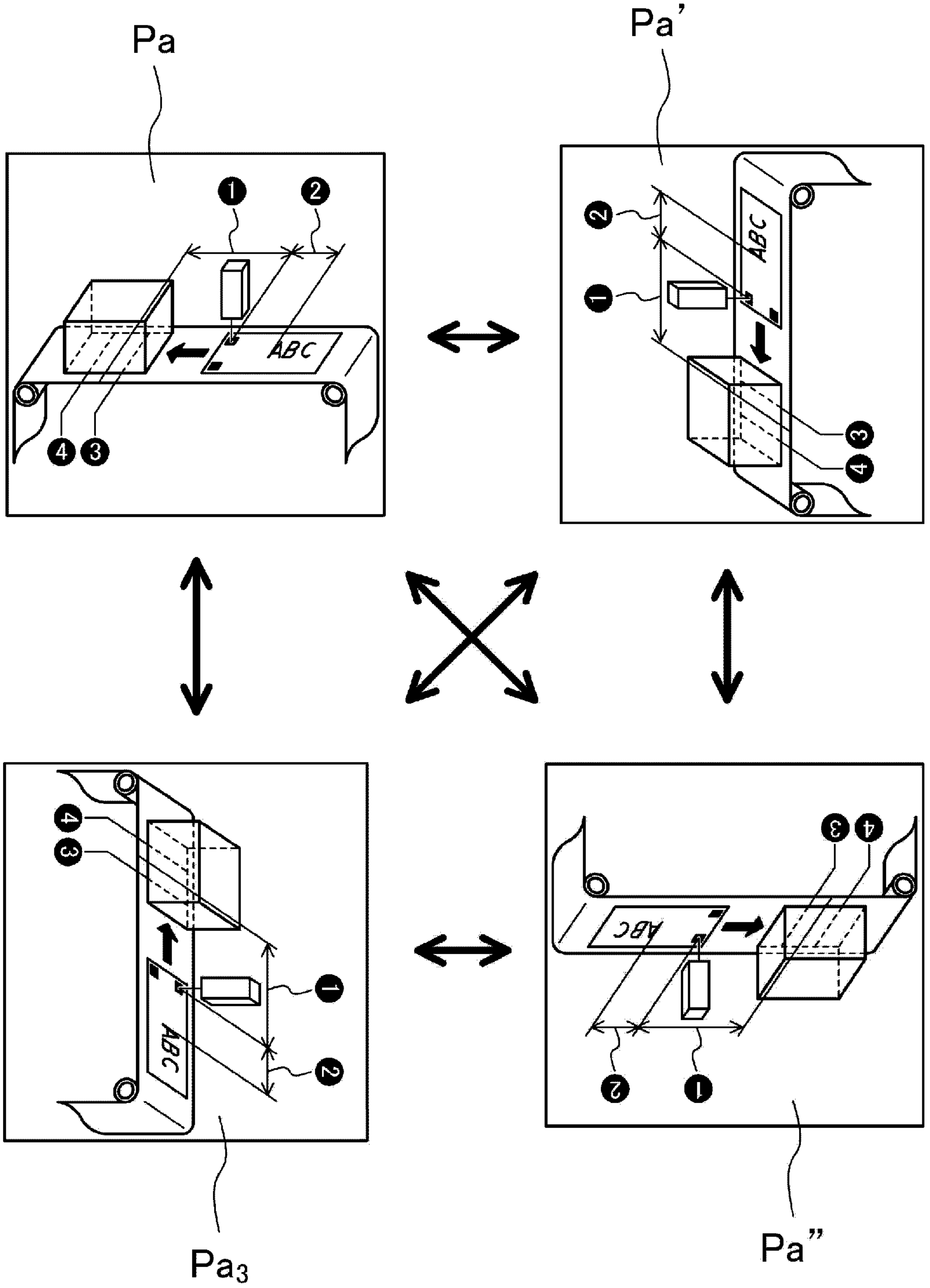
FIG. 21 is a diagram for describing rotation of the setting-assist image.

Further, as illustrated in FIGS. 20 and 21, for example, the setting section 103 according to this embodiment is configured to display the setting-assist images Pa, Pa', Pa", and $Pa_3$ corresponding to a posture of the laser marking apparatus L, particularly the marker head 1, among the plurality of setting-assist images Pa, Pa', Pa", and $Pa_3$.

Specifically, the setting section 103 is configured to receive a user input indicating the posture of the marker head 1 and to display the setting-assist images Pa, Pa', Pa", and $Pa_3$ corresponding to the posture indicated by the user input from among the plurality of setting-assist images Pa, Pa', Pa", and $Pa_3$ in order to select one of the plurality of setting-assist images Pa, Pa', Pa", and $Pa_3$.

More specifically, the setting section 103 controls the display section 102 via the display control section 105 to display a thirty-third display item I33 for selecting one of the setting-assist images Pa, Pa', Pa", and $Pa_3$ on the job information setting screen $D4_5$. For example, when a tap operation is performed once on the thirty-third display item I33 in the state illustrated in FIG. 16, the second setting-assist image Pa' obtained by rotating the setting-assist image Pa by 90° is displayed in the image display area R3 as illustrated in FIG. 20.

The display mode of the image display area R3 transitions every time the thirty-third display item I33 receives a user input as indicated by an arrow in FIG. 21. Specifically, the third setting-assist image Pa" obtained by further rotating the second setting-assist image Pa' by 90° is displayed in the image display area R3 when the thirty-third display item I33 is operated in a state where the second setting-assist image Pa' is displayed, the fourth setting-assist image $Pa_3$ obtained by further rotating the third setting-assist image Pa" by 90° is displayed in the image display area R3 when the thirty-third display item I33 is operated in such a state, and the first setting-assist image Pa obtained by further rotating the fourth setting-assist image $Pa_3$" by 90° is displayed in the image display area R3 when the thirty-third display item I33 is operated in such a state. Along with the rotation of the image, a visual display indicating the first offset amount O1 and the second offset amount O2 may also be rotated.

In addition, the thirty-third display item I33 can be used as a so-called scroll bar, and can be freely switched to one of the four setting-assist images Pa, Pa', Pa", and $Pa_3$ without performing a tap operation on the thirty-third display item I33 a plurality of times.

Note that it suffices that the "plurality of mutually different setting-assist images Pa, Pa', Pa", and $Pa_3$" referred to herein are obtained by rotating one image each by 90° as described with reference to FIG. 21 and the like. With this configuration, it is possible to implement the four setting-assist images Pa, Pa', Pa", and $Pa_3$ only by preparing one image without separately preparing four images.

(3) Rotation of Character String in Setting-Assist Image

In general, an orientation (for example, an arrangement direction of a character string in the character string "ABC") of the character string in the workpiece element We can be appropriately changed in accordance with a type of the print job Pj. Although the orientation of the character string can be changed at the time of setting the print block Pb, for example, by operating the second switching tab I10 in FIG. 14, it is advantageous to change the orientation also at the time of setting the job information in order to improve usability.

Therefore, in this embodiment, the setting section 103 controls the display section 102 via the display control section 105 to display a thirty-third display item I34 for changing the orientation of the character string in the job information setting screen $D4_5$.

Figure 22A:
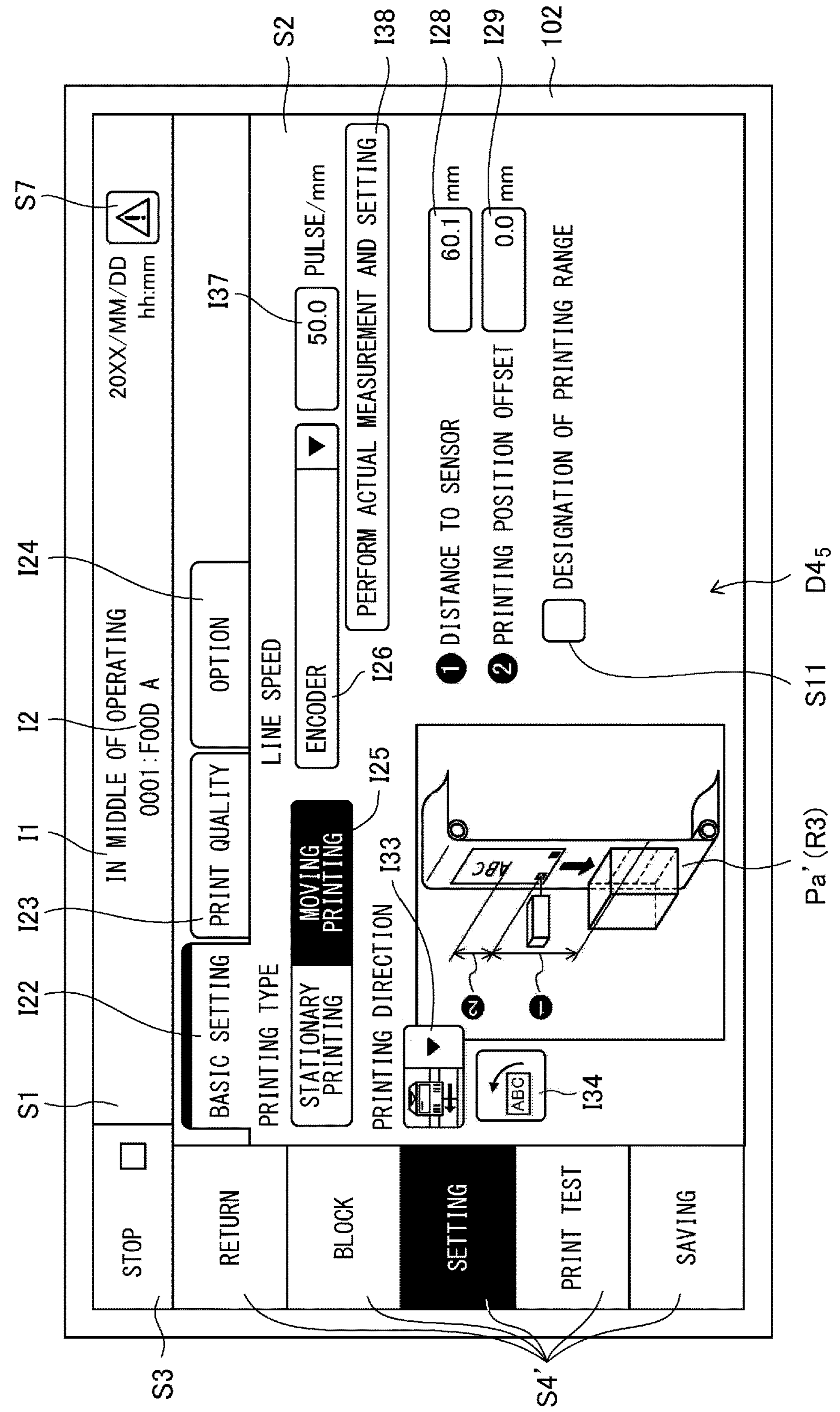
FIG. 22A is a diagram for describing switching of an orientation of a character string.
Figure 22B:
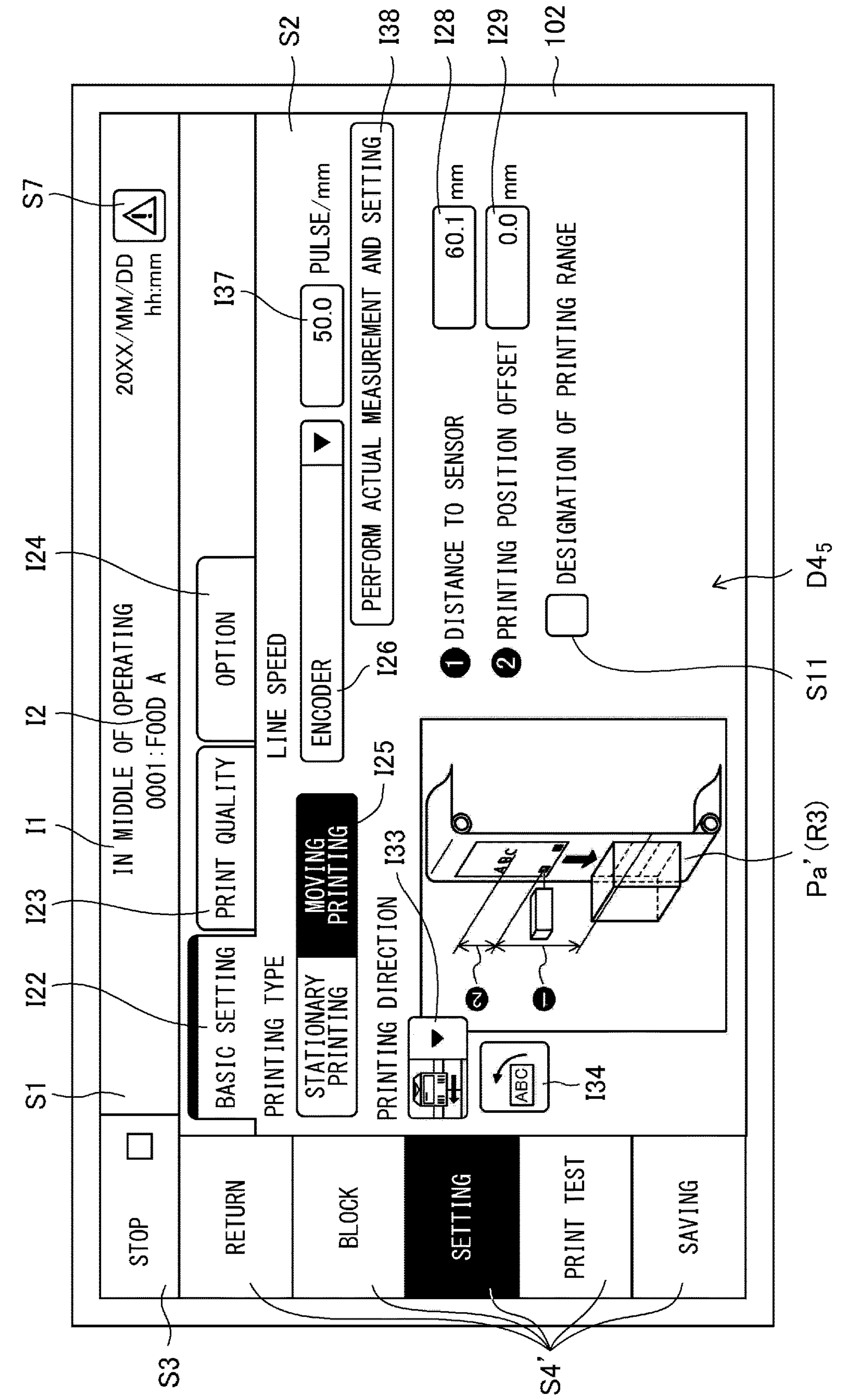
FIG. 22B is a diagram for describing the switching of the orientation of the character string.

For example, when the setting-assist image Pa is caused to transition to the second setting-assist image Pa' in the state illustrated in FIG. 18, the character string is also integrally rotated as illustrated in FIG. 22A. In this state, when a tap operation is performed on the thirty-fourth display item I34 once or a plurality of times, the character string in the second setting-assist image Pa' can be rotated by 90° as illustrated in FIG. 22B. The character string can be rotated by 180° or the character string can be rotated by 270° by further operating 34 display item I34. In this manner, only the character string can be rotated alone in the state where the setting-assist image Pa is rotated.

(4) Subsequent Processing

When receiving a user input with respect to an interface marked as "save" in the switch button S6, the setting section 103 and the reception section 104 complete the setting related to the job information. The settings performed in this manner are stored in the storage apparatus 120 for each of the print jobs Pj. As the setting is completed, the display control section 105 causes the display section 102 to transition from the job information setting screen $D4_5$ to the print test screen $D4_6$ to provide an interface related to a print test. With this transition, a control process illustrated in FIG. 8 proceeds from step St16 to step St17. Note that step St17 is not essential, and may be skipped if necessary.

—Step St17—

In step St17 of FIG. 8, the setting section 103 and the reception section 104 perform setting change or the like based on the print test for the print job Pj that is being selected on the job menu screen D4' based on a user input with respect to the print test screen $D4_6$.

Figure 24:
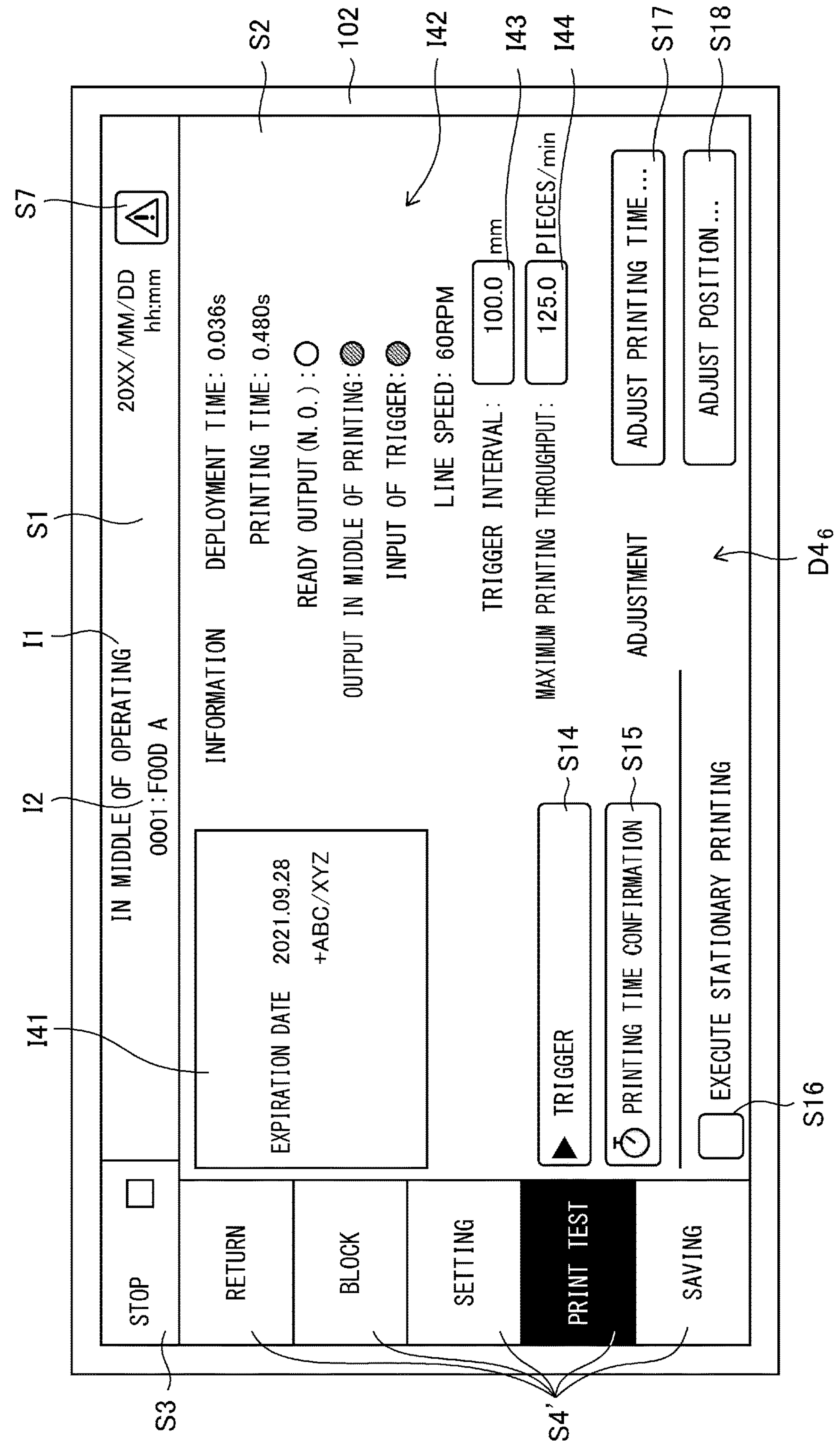
FIG. 24 is a diagram illustrating a display mode of a print test screen.

As illustrated in FIG. 24, the print test screen $D4_6$ includes, main display items, a forty-first display item I41 that displays a print test result, a trigger button S14 and a printing time confirmation button S15 for executing the print test, a check box S16 that switches whether or not to execute stationary printing at the time of the print test, a forty-second display item I42 that displays a time required for deployment processing (deployment time), a time required for printing (printing time), a line speed, and the like, a forty-third display item I43 that receives an input of a trigger interval, a forty-fourth display item that displays a maximum printing throughput, a printing time adjustment button S17 that executes adjustment of the printing time, and a printing position adjustment button S18 for adjusting a printing position. Note that when the printing time adjustment button S17 is clicked, a screen for editing a scan speed is displayed. In addition, when the printing position adjustment button S18 is clicked, a screen for adjusting XY positions of a print block is displayed.

(1) Processing Related to Orientation of Character String

For example, when receiving a tap operation or the like on the printing position adjustment button S18, the display control section 105 causes the display section 102 to display an adjustment screen (not illustrated) for adjusting a printing position. On this adjustment screen, a relative position of the print job Pj with respect to each of the workpiece elements We can be adjusted, and an optimum printing position in accordance with an orientation of the setting-assist image Pa, an orientation of a character string, and the like can be set.

At that time, the setting section 103 can automatically associate a direction viewed in the irradiation area R1 and the setting plane R2 with an offset direction of the relative position in accordance with the orientation of the character string (the arrangement direction of the character string) set as described above.

For example, as illustrated in FIG. 22A, when the arrangement direction of the character string is set to be parallel to the conveyance direction At, the offset direction perpendicular to the conveyance direction At is a direction perpendicular to the arrangement direction of the character string viewed on the setting plane R2. At the same time, the offset direction extending parallel to the conveyance direction At is a direction that coincides with the arrangement direction of the character string viewed on the setting plane R2.

On the other hand, as illustrated in FIG. 22B, when the arrangement direction of the character string is set to be perpendicular to the conveyance direction At, the offset direction perpendicular to the conveyance direction At is the direction that coincides with the arrangement direction of the character string viewed on the setting plane R2. At the same time, the offset direction extending parallel to the conveyance direction At is the direction perpendicular to the arrangement direction of the character string viewed on the setting plane R2.

In this manner, the setting section 103 according to this embodiment can automatically associate the conveyance direction At with the direction viewed on the setting plane R2 in accordance with the orientation of the character string described with reference to FIGS. 22A and 22B.

(2) Processing Related to Maximum Printing Throughput

The "maximum printing throughput" indicates an upper limit of the workpiece elements We that can be marked per predetermined time (for example, one minute). For example, in a case where the maximum printing throughput is 125.0 [pieces/min] as illustrated in FIG. 24, it means that the upper limit of the workpiece elements We that can be marked is 125 pieces per minute. The maximum printing throughput generally has a negative correlation with the conveyance speed of the workpiece W, and can also be said to be a parameter that characterizes an upper limit value of the conveyance speed.

In general, if a printing interval is set to be excessively short in moving printing, every time marking is performed on the workpiece element We, a start position of the marking viewed on the workpiece element We gradually deviates, and eventually, the start position is likely to be offset to the outside of the range of the irradiation area R1.

In order to suppress such an event, it is conceivable to set an upper limit to the printing interval, but it is difficult for an unfamiliar user to set such an upper limit, and there is room for improvement from the viewpoint of improvement in usability.

Therefore, the setting section 103 according to this embodiment calculates the upper limit of the conveyance speed of the flexible workpiece W based on a reception interval of the trigger signal by the second IF section 107, a width (hereinafter, also referred to as a "printing area width") of each of the irradiation areas R1 in the conveyance direction At, and a marking time required for marking on each of the workpiece elements We. This upper limit value may be calculated as the upper limit value of the conveyance speed of the workpiece W, or may be calculated as the parameter that characterizes the upper limit of the conveyance speed as in the maximum printing throughput described above. Here, a case of calculating the maximum printing throughput will be described.

In calculating the maximum printing throughput, the setting section 103 executes a print test with a user input with respect to the trigger button S14 or the printing time confirmation button S15 as a trigger, and updates a printing time (corresponding to the above-described marking time) required for the print test. Marking is actually executed when the trigger button S14 is operated, and only an operation related to printing is executed without emission of a laser when the printing time confirmation button S15 is operated. In addition, if there is a function of predicting the printing time, the printing time may be predicted using the function.

Note that the printing time (marking time) referred to herein means a time elapsed from the start of printing to the start of the next printing, and includes a time required to return a scanner mirror constituting the laser light scanning section 3 to a predetermined position, and a time required to return an operation state related to control of laser light to a printing start state.

Thereafter, the setting section 103 receives an input of a trigger interval through the forty-third display item I43. When "constant speed printing" is selected in a setting of job information, the trigger interval may be manually input by the user. Similarly, when "film rotation speed" is selected, a value of the mark interval Im may be automatically input.

Thereafter, the setting section 103 reads the printing area width from the storage apparatus 120 or the like. As described in the description of the setting-assist image Pa, the distance from the start position to the end position is used as the printing area width when the setting of at least one of the marking start position in the irradiation area R1 and the marking end position in the irradiation area R1 is changed. In this case, the printing area width is narrower than that of a case where the setting change is not performed.

Further, when a movement path in which a position of the workpiece W changes along the Z direction is adopted in addition to movement of the workpiece W along an XY plane, the irradiation area R1 can be a three-dimensional curved surface along the movement path of the workpiece W. In this case, the marker controller 100 performs correction in accordance with the three-dimensional curved surface before and after the above-described deployment processing. In a case where such correction is performed, the printing area width becomes narrower than that of a case where the correction is not performed.

Note that, in a case where the setting change of the marking start position and/or end position and the correction related to the three-dimensional curved surface are performed together, the setting section 103 adopts the narrowest printing area width.

Thereafter, the setting section 103 compares a magnitude relationship between the trigger interval and the narrowest printing area width, and sets the narrower one as an "effective printing area width". The setting section 103 may store a value of the effective printing area width in the storage apparatus 120 or display the value on the print test screen $D4_6$.

Thereafter, the setting section 103 calculates an upper limit value of the conveyance speed through the following arithmetic operation.

Upper limit value [mm/s] of conveyance speed=Effective printing area width [mm]/Printing time [s] (E)

Thereafter, the setting section 103 calculates the maximum printing throughput through the following arithmetic operation and displays the calculated maximum printing throughput on the forty-fourth display item I44.

Maximum printing throughput [pieces/min]=60/(Trigger interval [mm]/Upper limit value [mm/s] of conveyance speed) (F)

The user can correct the job information by referring to the displayed maximum printing throughput.

(3) Subsequent Processing

When the processing related to the print test is completed, the display control section 105 causes the display content to transition from the print test screen $D4_6$ or the job information setting screen $D4_5$ to the home screen D4 or the job menu screen D4'. With this transition, the control process illustrated in FIG. 8 ends the processing related to step St17, and proceeds from step St1 to step St2 in FIG. 7.

The display content transitions to the home screen D4 or the job menu screen D4'. With this transition, a control process illustrated in FIG. 9 ends the processing related to step St13, and proceeds from step St1 to step St2 in FIG. 8.

(Step St2)

Figure 9:
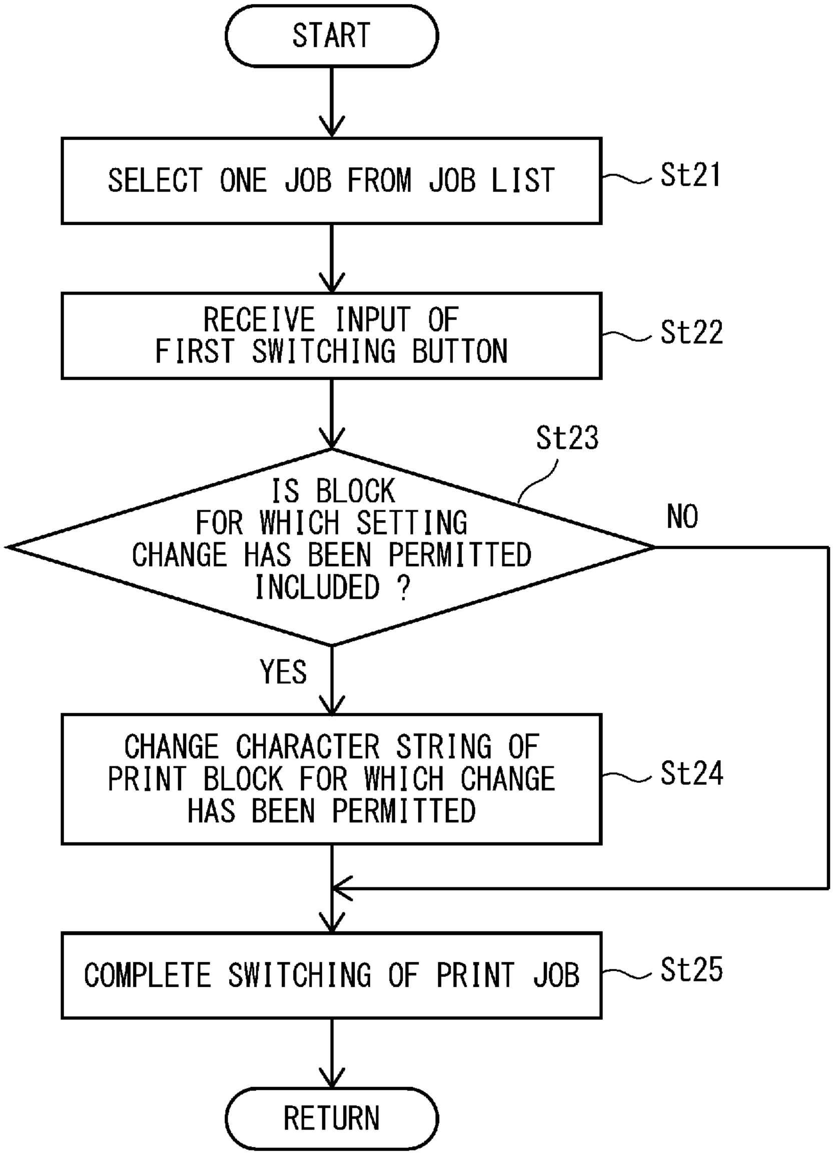
FIG. 9 is a flowchart illustrating processing related to switching of a print job.

FIG. 9 is a flowchart illustrating processing related to the switching of the print job Pj, and is a diagram illustrating details of step St2 of FIG. 7. That is, step St2 of FIG. 7 corresponds to steps St21 to St25 of FIG. 9 expressed as one step. Note that, in a case where the job switching is unnecessary, the control process skips step St2 and proceeds to step St3. The following description is based on the premise that the job switching is performed.

In step St21, the display control section 105 displays the job menu screen D4' on the display section 102 based on an operation input of the user. In this case, the currently selected print job Pj is displayed on the setting plane R2. In this state, the controller main body 100*a* selects one print job Pj from the list of the print jobs Pj based on a user input with respect to the seventh display item I7.

In the subsequent step St22, the reception section 104 receives a user input such as a tap operation or a click operation on the switch button S6 in a state where the print job Pj as a switching destination is selected.

In the subsequent step St23, the reception section 104 determines whether or not the print job Pj as the switching destination includes the print block Pb for which the setting change has been permitted. This determination is made based on the change rule Cl stored in the storage apparatus 120.

When the determination in step St23 is NO, the control process skips step St24 and proceeds to step St25 to complete the switching of the print job Pj. In this case, the controller main body 100*a* executes deployment processing on data indicating the switched print job Pj, and generates deployment data corresponding to this print job Pj.

On the other hand, when the determination in step St23 is YES, the control process proceeds from step St23 to step St24. In this case, the display control section 105 causes the display content to transition from the job menu screen D4' to a preview screen (not illustrated) which forms one of the operating screens similarly to the job menu screen D4'.

Although details are omitted, on the preview screen, the print blocks Pb for which the setting change has been permitted can be displayed side by side, or an editing screen for the print blocks Pb for which the setting change has been permitted can be displayed.

When an editing operation (for example, a change of the character string of each of the print blocks Pb) on the print block Pb for which the setting change has been permitted is completed, the setting section 103 completes the setting caused by the job switching, and advances the control process from step St24 to step St25. As a result, the control process illustrated in FIG. 9 ends the entire processing illustrated in the same drawing, and proceeds from step St2 to step St3 in FIG. 7.

(Step St3)

Figure 10:
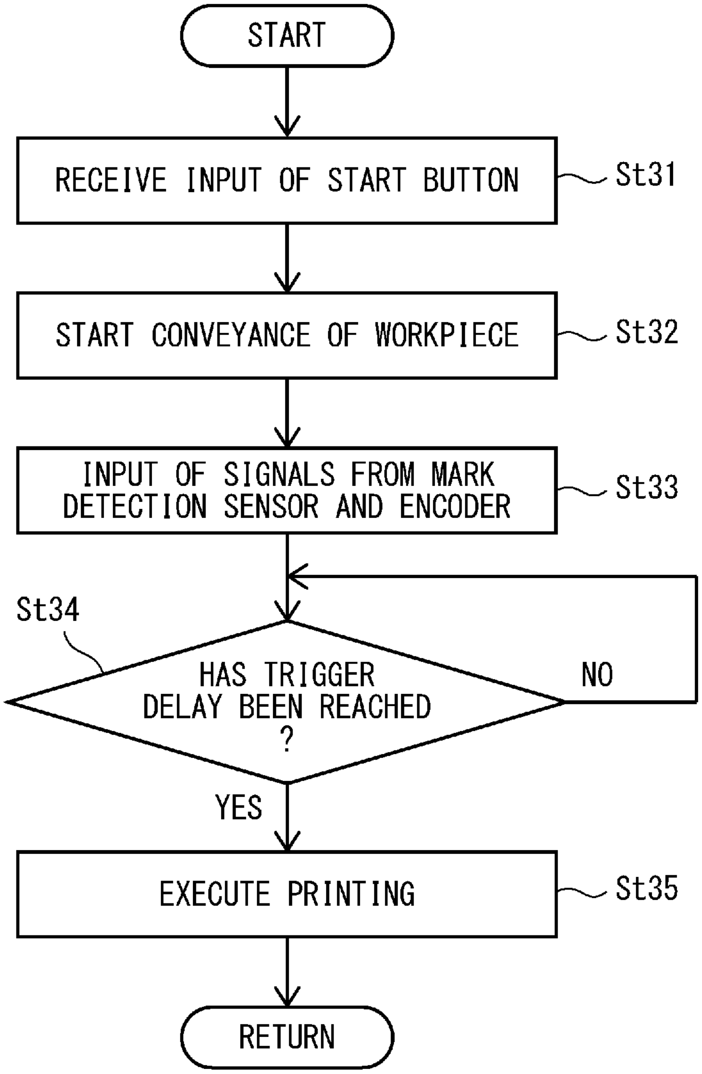
FIG. 10 is a flowchart illustrating processing related to operation of the print job.

FIG. 10 is a flowchart illustrating processing related to the operation of the print job Pj, and is a diagram illustrating details of step St3 of FIG. 7. That is, step St3 of FIG. 7 corresponds to steps St31 to St35 of FIG. 10 expressed as one step.

First, in step St31, the controller main body 100*a* receives a user input such as a tap operation or a click operation on the switch button S3.

In the subsequent step St32, the processing equipment 500 is operated through a control signal or the like from the PLC 402, and the conveyance of the workpiece W is started. In the subsequent step St33, detection signals from the encoder 401, the mark detection sensor 403, and the like are input with respect to the controller main body 100*a*.

In the subsequent step St34, it is determined whether or not the movement amount of the workpiece element We after the input of the trigger signal has reached the trigger delay Of based on the input detection signals. The process proceeds to step St35 in a case where the determination is YES, and the determination related to step St34 is repeated in a case of NO. This determination may be made based on whether or not an elapsed time since the input of the trigger signal has reached a time corresponding to the trigger delay Of.

In the subsequent step St35, the marking control section 109 controls the laser light generation section 2 and the laser light scanning section 3 to perform marking on each of the workpiece elements We.

<Regarding Assist of Setting of Laser Marking Apparatus L>

As illustrated in FIG. 16 and the like, the laser marking apparatus L starts marking when the movement amount of the workpiece W reaches the trigger delay Of according to this embodiment. Here, as the setting-assist image Pa is displayed on the display section 102, even the unfamiliar user can easily set the trigger delay Of with reference to the setting-assist image Pa. Accordingly, the convenience in use of the laser marking apparatus L can be improved.

In addition, the setting-assist images Pa, Pa', Pa", and $Pa_3$ suitable for installation situations of the laser marking apparatus L can be displayed as illustrated in FIGS. 20 and 21, and accordingly, the convenience in use of the laser marking apparatus can be further improved.

In addition, as illustrated in the thirty-third display item I33 in FIG. 20 and the like, the posture of the laser marking apparatus L can be input, and the setting-assist images Pa, Pa', Pa", and $Pa_3$ suitable for the input contents can be displayed, so that the convenience in use of the laser marking apparatus L can be further improved.

In addition, as illustrated in FIG. 22, one setting-assist image Pa is rotated by 90°, 180°, or 270° and displayed instead of preparing the plurality of setting-assist images, so that an image suitable for the posture of the laser marking apparatus L can be more easily displayed.

In addition, each parameter can be measured using the ruler or the like in the case of adopting the configuration in which the inputs of the first offset amount O1 and the second offset amount O2 are received instead of directly receiving the input of the trigger delay Of as illustrated in the twenty-eighth display item I28 and the twenty-ninth display item I29 in FIG. 16 and the like. This contributes to the improvement in the convenience in use of the laser marking apparatus L.

In addition, as illustrated in the thirty-first display item I31 and the thirty-second display item I32 in FIG. 16 and the like, when the start position of the marking is set close to a central portion Pa of an irradiation range (irradiation area R1), the print quality can be improved as compared with that of a case where the start position is set at an edge portion of the irradiation area R1. Since it is configured such that more detailed settings are allowed in this manner, it is possible to implement the settings with more variations, which is advantageous in terms of improving the convenience in use of the laser marking apparatus L.

What is claimed is:

1. A laser marking apparatus that performs marking using laser light on a sheet-like flexible workpiece to which alignment marks are affixed at equal intervals along a conveyance direction, the laser marking apparatus comprising:

a laser light generation section that generates the laser light;

a laser light scanning section that scans a surface of the flexible workpiece with the laser light generated by the laser light generation section;

a setting section that sets a print pattern that needs to be marked on the flexible workpiece and sets an offset amount from an irradiation range of the laser light by the laser light scanning section to a marking start position of the print pattern in the flexible workpiece at the time when a predetermined trigger signal is received;

an interface section that receives the trigger signal every time the alignment mark is detected during conveyance of the flexible workpiece;

a movement amount monitoring section that determines whether or not a movement amount of the flexible workpiece corresponding to the trigger signal has reached an offset amount every time the interface section receives the trigger signal; and a marking control section that controls the laser light scanning section such that the print pattern set by the setting section is marked on the flexible workpiece based on a determination result of the movement amount monitoring section when the interface section receives the trigger signal, wherein the setting section is configured to cause a display section to display a setting-assist image, which visually indicates the alignment marks on the flexible workpiece and the offset amount, and to receive a user input for setting the offset amount in a state where the setting-assist image is displayed.

2. The laser marking apparatus according to claim 1, wherein one of a plurality of setting-assist images, which are different from each other, is displayed on the display section as the setting-assist image, and the setting section displays a setting-assist image corresponding to a posture of the laser marking apparatus among the plurality of setting-assist images.

3. The laser marking apparatus according to claim 2, wherein the setting section receives a user input indicating a posture of the laser marking apparatus, and displays a setting-assist image corresponding to the posture indicated by the user input from among the plurality of setting-assist images.

4. The laser marking apparatus according to claim 2, wherein the setting section causes the display section to display images obtained by rotating one setting-assist image each by 90°, by 45°, or by 30° as the plurality of setting-assist images.

5. The laser marking apparatus according to claim 1, wherein the setting-assist image further visually indicates a distance between a sensor that detects the alignment marks and the laser marking apparatus, and the setting section is configured to receive an input of the distance indicated by the setting-assist image.

6. The laser marking apparatus according to claim 1, wherein the setting-assist image further visually indicates a start position of marking in the irradiation range, and an end position of the marking in the irradiation range, and the setting section is configured to receive inputs of the start position and the end position.

7. The laser marking apparatus according to claim 1, wherein the setting section is configured to be capable of switching a display content on the display section between a first setting screen that visually indicates the setting-assist image, and a second setting screen that receives an input of print quality including a scanning speed of the laser light scanning section.

8. The laser marking apparatus according to claim 1, further comprising a second interface section connected to an encoder, which outputs a pulse signal in accordance with a conveyance speed of the flexible workpiece, so as to be capable of receiving the pulse signal, wherein the setting section calculates a number of pulses output when the flexible workpiece moves by a predetermined distance based on the pulse signal input via the second interface section.

9. The laser marking apparatus according to claim 1, wherein the setting section calculates an upper limit value of a number of times of marking executable per predetermined time based on a reception interval of the trigger signal by the interface section, a length of the irradiation area in the conveyance direction, and a marking time required for marking the flexible workpiece.

* * * * *